United States Patent
Ozawa et al.

(10) Patent No.: US 8,356,943 B2
(45) Date of Patent: Jan. 22, 2013

(54) BEARING DEVICE FOR WHEEL

(75) Inventors: Masahiro Ozawa, Iwata (JP); Mitsuru Umekida, Iwata (JP); Yuichi Asano, Iwata (JP)

(73) Assignee: NTN Corporation, Osaka (JP)

( * ) Notice: Subject to any disclaimer, the term of this patent is extended or adjusted under 35 U.S.C. 154(b) by 450 days.

(21) Appl. No.: 12/675,172

(22) PCT Filed: Aug. 25, 2008

(86) PCT No.: PCT/JP2008/065080
§ 371 (c)(1),
(2), (4) Date: Feb. 25, 2010

(87) PCT Pub. No.: WO2009/028441
PCT Pub. Date: Mar. 5, 2009

(65) Prior Publication Data
US 2010/0209035 A1    Aug. 19, 2010

(30) Foreign Application Priority Data
Aug. 30, 2007   (JP) ................................. 2007-224269

(51) Int. Cl.
*F16C 13/00* (2006.01)
(52) U.S. Cl. ........................................ 384/544; 384/589
(58) Field of Classification Search .... 403/359.1–359.6; 464/178, 182, 906; 384/544, 589
See application file for complete search history.

(56) References Cited

U.S. PATENT DOCUMENTS
6,497,515 B1 * 12/2002 Sahashi et al. ................ 384/544
2004/0234182 A1  11/2004 Tajima et al.

FOREIGN PATENT DOCUMENTS

| | | |
|---|---|---|
| EP | 1 396 354 | 3/2004 |
| JP | 08-226426 | 9/1996 |
| JP | 2002-002211 | 1/2002 |
| JP | 2003-65347 | 3/2003 |
| JP | 2004-340311 | 12/2004 |
| JP | 2005-041311 | 2/2005 |
| JP | 2005-193757 | 7/2005 |
| JP | 2007-055322 | 3/2007 |
| JP | 2007-055503 | 3/2007 |
| JP | 2007-085372 | 4/2007 |
| WO | 02/102608 | 12/2002 |

OTHER PUBLICATIONS

International Preliminary Report on Patentability and Written Opinion of the International Searching Authority mailed Apr. 8, 2010 in International (PCT) Application No. PCT/JP2008/065080.
International Search Report issued Nov. 18, 2008 in International (PCT) Application No. PCT/JP2008/065080.

* cited by examiner

*Primary Examiner* — Phillip A Johnson
(74) *Attorney, Agent, or Firm* — Wenderoth, Lind & Ponack, L.L.P.

(57) ABSTRACT

A bearing device for a wheel is capable of suppressing a backlash in a circumferential direction, is excellent in coupling operability of a hub wheel and an outer joint member of a constant velocity universal joint, and is excellent for maintenance by allowing separation of the hub wheel and the outer joint member of the constant velocity universal joint. In the bearing device for a wheel, a hub wheel, a double-row roller bearing, and a constant velocity universal joint are unitized together, and the hub wheel and a shaft section of an outer joint member of the constant velocity universal joint are separably coupled with each other through intermediation of a recess-projection fitting structure, the shaft section being inserted in a fitting manner into a hole portion of the hub wheel.

20 Claims, 10 Drawing Sheets

BEARING DEVICE FOR WHEEL

TECHNICAL FIELD

The present invention relates to a bearing device for a wheel for supporting wheels to freely rotate relative to a vehicle body in a vehicle such as an automobile.

BACKGROUND ART

The bearing device for a wheel has evolved from a structure called first generation in which roller bearings in double rows are independently used to second generation in which a vehicle body attachment flange is integrally provided in an outer member. Further, third generation in which one inner rolling surface of the roller bearings in double rows is integrally formed with an outer circumference of a hub wheel integrally having a wheel attachment flange has been developed. Further, fourth generation in which a constant velocity universal joint is integrated with the hub wheel and another inner rolling surface of the roller bearings in double rows is integrally formed with an outer circumference of an outer joint member constituting the constant velocity universal joint has been developed.

For example, the bearing device for a wheel called third generation is described in Patent Document 1. The bearing device for a wheel called third generation includes, as illustrated in FIG. 10, a hub wheel 102 having a flange 101 extending in an outer diameter direction, a constant velocity universal joint 104 having an outer joint member 103 fixed to this hub wheel 102, and an outer member 105 arranged on an outer circumferential side of the hub wheel 102.

The constant velocity universal joint 104 includes the outer joint member 103, an inner joint member 108 arranged in a cup-shaped section 107 of this outer joint member 103, a ball 109 arranged between this inner joint member 108 and the outer joint member 103, and a cage 110 that retains this ball 109. A spline section 111 is formed on an inner circumferential surface of a center hole of the inner joint member 108. An end spline section of a shaft (not shown) is inserted into this center hole, whereby the spline section 111 on the inner joint member 108 side and the spline section on the shaft side are engaged.

Further, the hub wheel 102 includes a cylinder section 113 and the flange 101. A short-cylindrical pilot section 115, on which a wheel and a brake rotor (not shown) are mounted, is protrudingly provided on an outer end surface 114 (end surface on an opposite joint-side) of the flange 101. Note that, the pilot section 115 includes a large-diameter first section 115*a* and a small-diameter second section 115*b*. The wheel is externally fitted onto the first section 115*a*, and the brake rotor is externally fitted onto the second section 115*b*.

Then, a notch section 116 is provided in an outer circumferential surface at an end portion on the cup-shaped section 107 side of the cylinder section 113. An inner race 117 is fitted in this notch section 116. A first inner raceway surface 118 is provided near a flange on an outer circumferential surface of the cylinder section 113 of the hub wheel 102. A second inner raceway surface 119 is provided on an outer circumferential surface of the inner race 117. Further, a bolt inserting hole 112 is provided in the flange 101 of the hub wheel 102. A hub bolt for fixing the wheel and the brake rotor to this flange 101 is inserted into this bolt inserting hole 112.

In the outer member 105, double-row outer raceway surfaces 120, 121 are provided on an inner circumference thereof, and a flange (vehicle body attachment flange) 132 is provided on an outer circumference thereof. A first outer raceway surface 120 of the outer member 105 and the first inner raceway surface 118 of the hub wheel 102 are opposed to each other. A second outer raceway surface 121 of the outer member 105 and the raceway surface 119 of the inner race 117 are opposed to each other. Rolling elements 122 are interposed between those inner and outer raceway surfaces.

A shaft section 123 of the outer joint member 103 is inserted into the cylinder section 113 of the hub wheel 102. In the shaft section 123, a screw section 124 is formed at an end of a reverse cup-shaped section thereof. A spline section 125 is formed between this screw section 124 and the cup-shaped section 107. Further, a spline section 126 is formed in an inner circumferential surface (inner surface) of the cylinder section 113 of the hub wheel 102. When this shaft section 123 is inserted into the cylinder section 113 of the hub wheel 102, the spline section 125 on the shaft section 123 side and the spline section 126 on the hub wheel 102 side are engaged.

A nut member 127 is screwed into the screw section 124 of the shaft section 123 projecting from the cylinder section 113. The hub wheel 102 and the outer joint member 103 are connected. In this case, an inner end surface (rear surface) 128 of the nut member 127 and an outer end surface 129 of the cylinder section 113 come into contact with each other and an end surface 130 on the shaft section side of the cup-shaped section 107 and an outer end surface 131 of the inner race 117 come into contact with each other. In other words, when the nut member 127 is tightened, the hub wheel 102 is nipped by the nut member 127 and the cup-shaped section 107 through an intermediation of the inner race 117. Patent Document 1 JP 2004-340311 A

SUMMARY OF THE INVENTION

Problems to be Solved by the Invention

Conventionally, as described above, the spline section 125 on the shaft section 123 side and the spline section 126 on the hub wheel 102 side are engaged. Therefore, it is necessary to apply spline machining to both the shaft section 123 side and the hub wheel 102 side, and hence cost increases. When the shaft section 123 is press-fitted into the hub wheel 102, recesses and projections of the spline section 125 on the shaft section 123 side and the spline section 126 on the hub wheel 102 side need to be aligned. In this case, if the shaft section 123 is press-fitted into the hub wheel 102 by aligning tooth surfaces thereof, recessed and projected teeth are likely to be damaged (torn). Further, if the shaft section 123 is press-fitted into the hub wheel 102 by aligning the spline sections to a large diameter of the recessed and projected teeth rather than aligning the tooth surfaces, a backlash in a circumferential direction tends to occur. As described above, if there is the backlash in the circumferential direction in this way, transferability of rotation torque is low and abnormal noise tends to occur. Therefore, when the shaft section 123 is press-fitted into the hub wheel 102 by the spline fitting as in the prior art, it is difficult to solve both the damages to the recessed and projected teeth and the backlash in the circumferential direction.

Further, it is necessary for the nut member 127 to be screwed into the screw section 124 of the shaft section 123 projecting from the cylinder section 113. Thus, the assembly work involves screw fastening operation, resulting in a rather poor operability. Further, the number of components is large, resulting in a rather poor component controllability.

In view of the above-mentioned problems, the present invention provides a bearing device for a wheel capable of suppressing a backlash in a circumferential direction, excellent in coupling operability of the hub wheel and the outer joint member of the constant velocity universal joint, and excellent in maintenance property by allowing separation of the hub wheel and the outer joint member of the constant velocity universal joint from each other.

Means for Solving the Problems

The bearing device for a wheel according to the present invention includes the following:

a hub wheel;

a double-row roller bearing;

a constant velocity universal joint, the hub wheel, the double-row roller bearing, and the constant velocity universal joint being unitized together; and a recess-projection fitting structure through intermediation of which the hub wheel and a shaft section of an outer joint member of the constant velocity universal joint are separably coupled with each other, the shaft section being inserted in a fitting manner into a hole portion of the hub wheel, in which the recess-projection fitting structure includes the following:

projecting portions provided on one of an outer surface of the shaft section of the outer joint member and an inner surface of the hole portion of the hub wheel and extending in an axial direction, the projecting portions being press-fitted along the axial direction into another of the outer surface of the shaft section of the outer joint member and the inner surface of the hole portion of the hub wheel; and recessed portions formed with the projecting portions so as to be held in close contact with the projecting portions in a fitting manner on the another of the outer surface of the shaft section of the outer joint member and the inner surface of the hole portion of the hub wheel, the projecting portions and the recessed portions being held in close contact with each other through intermediation of an entire region of fitting contact regions therebetween, the recess-projection fitting structure allowing separation by being applied with a pulling-out force in the axial direction.

According to the bearing device for a wheel of the present invention, in the recess-projection fitting structure, the entire fitting contact regions between the projecting portions and the recessed portions are held in close contact with each other. Therefore, in this fitting structure, a gap in which a backlash occurs is not formed in a diameter direction and a circumferential direction. In addition, when the pulling-out force in the axial direction is applied to the shaft section of the outer joint member, the outer joint member can be detached from the hole portion of the hub wheel. Further, when the shaft section of the outer joint member is re-press-fitted into the hole portion of the hub wheel after pulling out the shaft section of the outer joint member from the hole portion of the hub wheel, it is possible to form the recess-projection fitting structure in which the projecting portions and the recessed portions are held in close contact with each other through intermediation of the entire region of the fitting contact regions.

It is preferred that the hub wheel and the shaft section of the outer joint member be subjected to bolt fixation with a bolt member threadedly engaged with a threaded hole formed at a shaft center portion of the shaft section of the outer joint member along the axial direction. With this, the shaft section of the outer joint member is regulated from being detached from the hub wheel in the axial direction.

The outer joint member includes a mouth section in which an inner joint member is mounted, and the shaft section protruding from a bottom portion of the mouth section, and an end portion of the hub wheel is forged so as to apply precompression to an inner race of the roller bearing fitted to an outside of the hub wheel. In this case, when a gap is formed between the mouth section of the outer joint member and a orbital forming section formed by forging the end portion of the hub wheel, or in a structure in which the outer joint member and the hub wheel are butted against each other, a seal member is arranged for sealing the gap.

A seal material is interposed between the bearing surface of the bolt member and the inner wall, the bolt member performing the bolt fixation of the hub wheel and the shaft section of the outer joint member.

The projecting portions of the recess-projection fitting structure are provided to the shaft section of the outer joint member, and the recessed portions, which are held in close contact with the projecting portions in the fitting manner, are formed with the projecting portions on the inner surface of the hole portion of the hub wheel by setting at least hardness of axial end portions of the projecting portions to be higher than that of an inner portion of the hole portion of the hub wheel, and by press-fitting the shaft section into the hole of the hub wheel from a side of the axial end portions of the projecting portions, whereby the recess-projection fitting structure may formed. In this case, the projecting portions gradually bite into a recessed-portion formation surface on a counterpart side (inner surface of hole portion of hub wheel), and accordingly the hole portion becomes slightly larger in diameter. As a result, the projecting portions are allowed to move in the axial direction. When the movement thereof in the axial direction is stopped, the hole portion is reduced in diameter for restoring the original diameter. With this, the entire of the recessed portion fitting regions of the projecting portions is brought into close contact with the recessed portions corresponding thereto.

It is preferred that a housing section for housing an extruded portion caused by formation of the recessed portions by the press-fitting be provided on an outer side of the shaft section on an opposite-joint side with respect to the recess-projection fitting structure. In this case, the extruded portion is constituted by a part of material having a volume equal to or larger than that of the recessed portions into (to) which the recessed portion fitting regions of the projecting portions are fitted, the part thereof being subjected to the following: forcing-out corresponding to the amount of the recessed portions to be formed; trimming for forming the recessed portions; forcing-out and trimming simultaneously performed; or the like.

An inner diameter dimension of the inner surface of the hole portion of the hub wheel is set to be smaller than a maximum radial dimension of a circle formed by connecting vertexes of the projecting portions, and to be larger than a maximum radial dimension of a circle formed by connecting bottoms of the recessed portions of the outer surface of the shaft section and among the projecting portions. With this, it is possible to correspond middle portions in a projecting direction of the projecting portions to positions on a recessed-portion formation surface of the hub wheel prior to formation of the recessed portions of the hole portion.

Further, the projecting portions of the recess-projection fitting structure are provided on the inner surface of the hole portion of the hub wheel, and the recessed portions, which are held in close contact with the projecting portions in the fitting manner, are formed with the projecting portions on the outer surface of the shaft section of the outer joint member by setting at least hardness of axial end portions of the projecting portions to be higher than that of an outer portion of the shaft section of the outer joint member of the constant velocity universal joint, and by press-fitting the projecting portions on a side of the hub wheel to the shaft section of the outer joint member from a side of the axial end portions of the projecting portions, whereby the recess-projection fitting structure may be formed. The projecting portions gradually bite into the outer surface of the shaft section, and accordingly the hole portion of the hub wheel becomes slightly larger in diameter. As a result, the projecting portions are allowed to move in the axial direction. When the movement thereof in the axial direction is stopped, the hole portion is reduced in diameter for restoring the original diameter. With this, the projecting portions and the recessed portions of the counterpart member to be fitted to the projecting portions (outer surface of shaft) are held in close contact with each other through intermediation of the entire region of fitting contact regions therebetween.

In this case, it is preferred that a housing section for housing an extruded portion caused by formation of the recessed portions by the press-fitting be provided on the inner surface of the hole portion of the hub wheel.

Further, a radial dimension of an arc formed by connecting vertexes of the plurality of projecting portions of the hole portion is set to be smaller than an outer diameter dimension of the shaft section of the outer joint member, and an inner diameter dimension of the inner surface of the hole portion among the projecting portions is set to be larger than the outer diameter dimension of the shaft section of the outer joint member. With this, it is possible to correspond the middle portions in the projecting direction of the projecting portions to positions on the recessed-portion formation surface of the shaft section prior to formation of the recessed portions.

It is preferred that a sum of circumferential thicknesses of middle portions in a projecting direction of the projecting portions be set to be smaller than a sum of circumferential thicknesses in positions corresponding to the middle portions in projecting portions on a fitting counterpart side in between the projecting portions adjacent to one another in a circumferential direction.

It is preferred that the recess-projection fitting structure be arranged at an immediate-underside avoiding position with respect to raceway surfaces of the roller bearing. This is because, when the shaft section is press-fitted into the hole portion of the hub wheel, the hub wheel expands. As a result of the expansion, hoop stress is generated on the raceway surfaces of the roller bearing. Incidentally, the hoop stress represents a force of expanding a diameter in the outer diameter direction. Thus, when hoop stress is generated on the raceway surfaces, reduction of rolling fatigue life, occurrence of cracks may be caused. In this context, by arranging the recess-projection fitting structure at the immediate-underside avoiding position with respect to the raceway surfaces of the roller bearing, hoop stress on the bearing raceway surfaces can be suppressed.

Effects of the Invention

According to the present invention, in the recess-projection fitting structure, there are formed no gaps in which a backlash occur in a radial direction or a circumferential direction. Thus, the entire fitting regions contribute to rotation torque transmission, and hence stable torque transmission is achieved. In addition, abnormal noise is not generated. Moreover, close contact with no gaps is achieved in the recess-projection fitting structure, and hence strength of torque transmission regions is increased. Therefore, the bearing device for a wheel can be reduced in weight and size.

Further, the outer joint member can be detached from the hole portion of the hub wheel by application of the pulling-out force in the axial direction to the shaft section of the outer joint member. Thus, it is possible to improve operability in repair and inspection of the components (maintenance property). In addition, by re-press-fitting the shaft section of the outer joint member into the hole portion of the hub wheel after the repair and inspection of the components, it is possible to form the recess-projection fitting structure in which the projecting portions and the recessed portions are held in close contact with each other through intermediation of the entire region of the fitting contact regions. Thus, it is possible to re-structure a bearing device for a wheel capable of performing stable torque transmission.

The projecting portions provided on the one of the outer surface of the shaft section of the outer joint member and the inner surface of the hole portion of the hub wheel are press-fitted along the axial direction into the another of the outer surface of the shaft section of the outer joint member and the inner surface of the hole portion of the hub wheel. With this, it is possible to form recessed portions to be held in close contact with the projecting portions in a fitting manner, and hence possible to reliably form the recess-projection fitting structure. In addition, it is unnecessary to form the spline and the like in advance on the member in which the recessed portions are formed. The bearing device for a wheel is excellent in productivity. Further, phase alignment of the splines is unnecessary. It is possible to achieve improvement of an assembly property, to thereby prevent damage to the tooth surfaces during press-fitting, and hence possible to maintain a stable fitting state.

As a result of bolt fixation, the shaft section is regulated from being detached from the hub wheel in the axial direction, and hence stable torque transmission is enabled over a long period of time. In particular, it is possible to achieve the following: stabilization of bolt fixation as a result of the provision of the inner wall sandwiched between the end surface on the opposite joint-side of the shaft section of the outer joint member and the head portion of the bolt member; stabilization of dimensional accuracy of the bearing device for a wheel as a result of the positioning; and stable securement of the axial length of the recess-projection fitting structure arranged in the axial direction. As a result, torque transmission properties can be increased.

Further, the end portion of the hub wheel is forged so as to apply precompression to the inner race of the roller bearing, and hence it is unnecessary to apply precompression to the inner race from the mouth section of the outer joint member. Thus, without consideration of precompression to the inner race, the shaft section of the outer joint member can be press-fitted, and coupling properties (assembly properties) of the hub wheel and the outer joint member can be improved. The mouth section is kept out of contact with the hub wheel, or held in contact therewith at low surface pressure of 100 Mpa or smaller. Thus, it is possible to prevent generation of abnormal noise due to relative movement caused by torsion of the mouth section and hub wheel in a rotational direction.

The gap between the mouth section of the outer joint member and the orbital forming section formed by forging the end portion of the hub wheel is sealed with the seal member. Thus, it is possible to prevent intrusion of rainwater and foreign matters from the gap, and hence possible to avoid deterioration in close contact property caused by rainwater, foreign matters, and the like to the recess-projection fitting structure. A seal member is interposed between the bearing surface of the bolt member for performing bolt fixation of the hub wheel and the shaft section of the outer joint member and the inner wall, and hence it is possible to prevent rainwater and foreign matters from intruding into the recess-projection fitting structure from the bolt member. As a result, quality of the bearing device for a wheel can be improved.

Further, it is possible to provide the projecting portions of the recess-projection fitting structure on the shaft section of the outer joint member, to set the hardness of the axial end portion of the projecting portions to be higher than that of the radially inner portion of the hole portion of the hub wheel, and to press-fit the shaft section from the axial end side of the projecting portions into the hole portion of the hub wheel. With this, it is possible to increase the hardness on the shaft section side and to improve the rigidity of the shaft section. Alternatively, it is possible to provide the projecting portions of the recess-projection fitting structure on the inner surface of the hole portion of the hub wheel, to set the hardness of the axial end portion of the projecting portions to be higher than that of the radially outer portion of the shaft section of the outer joint member of the constant velocity universal joint, and to press-fit the projecting portions on the hub wheel side from the axial end side thereof to the shaft section of the outer joint member. With this, it is unnecessary to perform hardness treatment (thermal treatment) on the shaft section side, and hence the outer joint member of the constant velocity universal joint is excellent in productivity.

By providing the housing section for housing the extruded portion formed by formation of the recessed portions in accordance with the press-fitting, it is possible to hold (maintain) the extruded portion in this housing section. Therefore, the extruded portion does not intrude into the vehicle and the like on the outside of the device. That is, it is possible to keep the extruded portion to be stored in the housing section, and hence unnecessary to perform removal processing for the extruded portion, and possible to achieve a reduction in the number of worker-hours for assembly and achieve improvement of assembly operability and cost reduction.

Further, the projecting portions are arranged so as to position middle portions in a projecting direction thereof on a recessed-portion formation surface prior to formation of the recessed portions. With this, the projecting portions gradually bite into the recessed-portion formation surface at the time of press-fitting, and hence the recessed portions can be reliably formed. That is, it is possible to sufficiently secure press-fitting allowance of the projecting portions with respect to the counterpart side. With this, the following can be achieved: stabilization of moldability of the recess-projection fitting structure, reduction of nonuniformity in press-fitting load, and stable torsional strength.

By setting the circumferential thicknesses of the middle portions in a projecting direction of the projecting portions on the higher hardness side to be smaller than the dimensions in positions corresponding to the middle portions in between the projecting portions adjacent to each other in the circumferential direction, it is possible to increase the circumferential thicknesses of the middle portions in a projecting direction of the projecting portions on the side in which the recessed portions are formed (projecting portions among recessed portions thus formed). Therefore, it is possible to increase a shearing area of the projecting portions on the counterpart side (projecting portions having low hardness between recessed portions because recessed portions are formed) and secure torsional strength. In addition, tooth thicknesses of the projecting portions on the higher hardness side are small, and hence it is possible to reduce press-fitting load and achieve improvement of press-fitting properties.

By arranging the recess-projection fitting structure at the immediate-underside avoiding position with respect to the raceway surfaces of the roller bearing, hoop stress on the bearing raceway surfaces is suppressed. With this, it is possible to prevent occurrence of failures with a bearing, such as reduction of rolling fatigue life, occurrence of cracks, and stress corrosion crack, and hence possible to provide a bearing of high quality.

Figure 1:
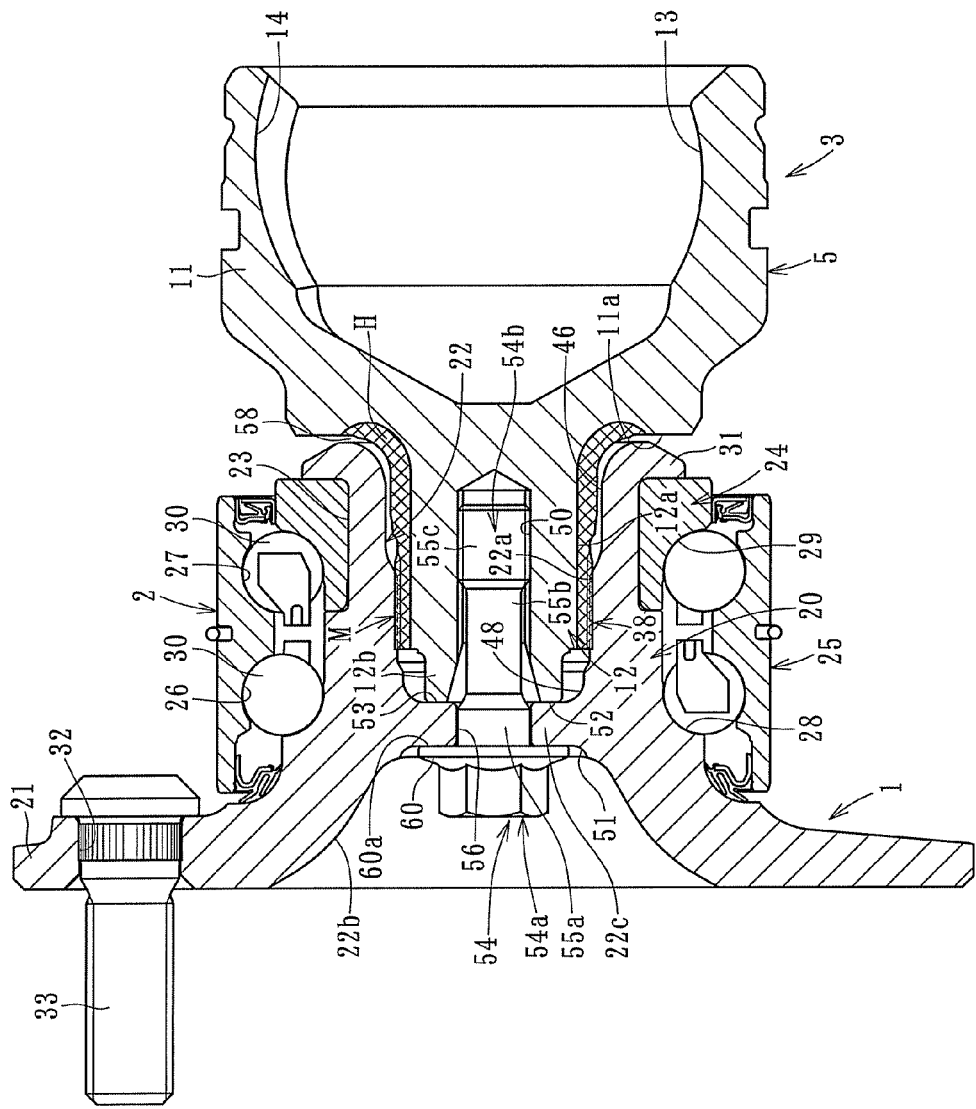
FIG. 1 A vertical sectional view of a bearing device for a wheel according to a first embodiment of the present invention.

DESCRIPTION OF SYMBOLS 1 hub wheel
2 bearing
3 constant velocity universal joint
11 mouth section
12 shaft section
22 hole portion
22c inner wall
24 inner race
31 orbital forming section
35 projecting portion
36 recessed portion
38 fitting contact region
45 extruded portion
50 threaded hole
52 end surface
54 bolt member
54a head portion
57 housing section
58 gap
59 seal member
60a bearing surface

DETAILED DESCRIPTION OF THE INVENTION

Embodiments of the present invention are described below with reference to FIGS. 1 to 9. A bearing device for a wheel according to a first embodiment is illustrated in FIG. 1. In this bearing device for a wheel, a hub wheel 1, a double-row roller bearing 2, and a constant velocity universal joint 3 are united together. Further, the hub wheel 1 and a shaft section 12 of an outer joint member of the constant velocity universal joint 3 inserted to a hole portion 22 of the hub wheel 1 are separably coupled with each other through intermediation of a recess-projection fitting structure M.

Figure 6:
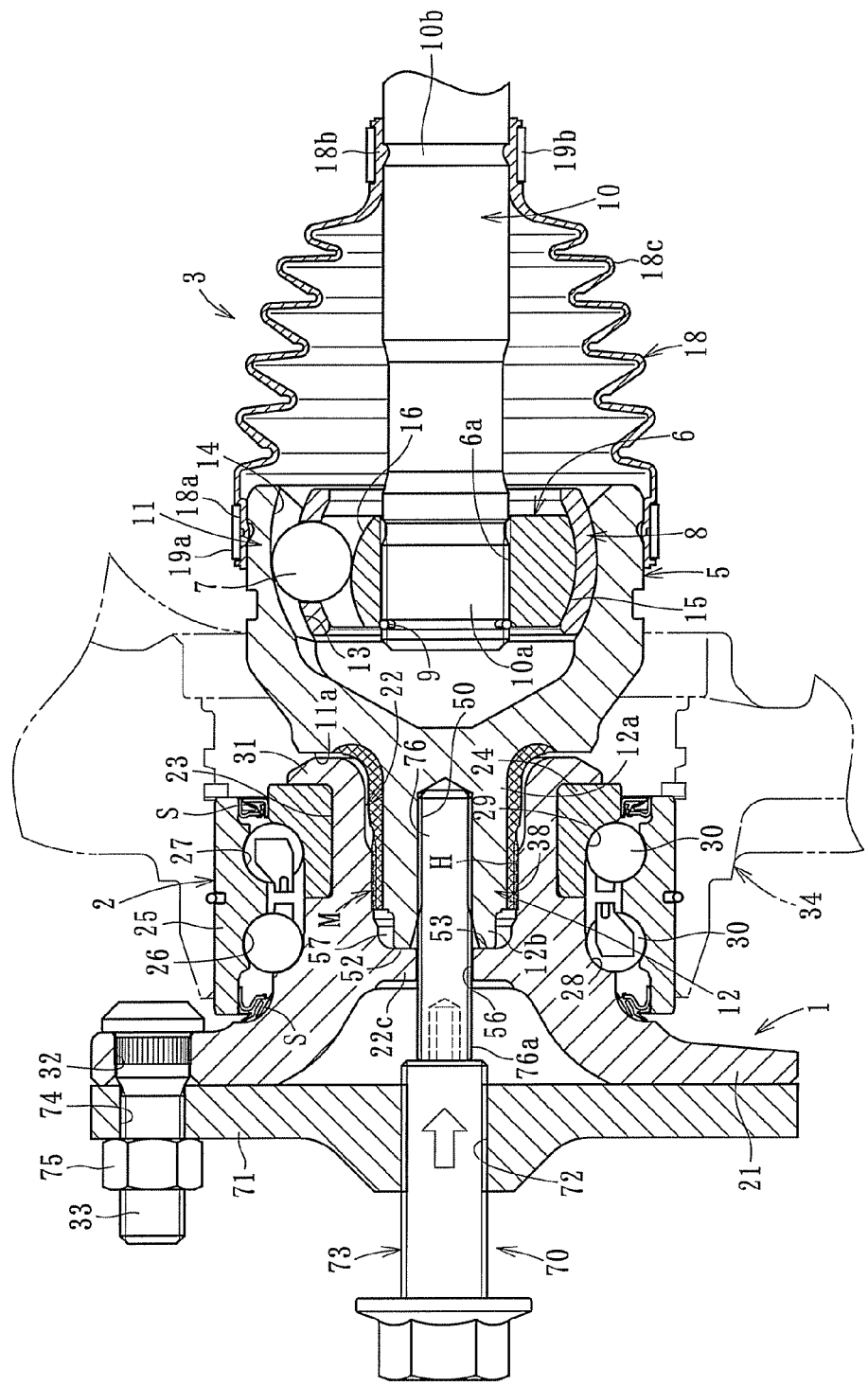
FIG. 6 A sectional view of a separation method for the recess-projection fitting structure.

As illustrated in FIG. 6, the constant velocity universal joint 3 mainly includes an outer race 5 as an outer joint member, an inner race 6 as an inner joint member arranged on the inner side of the outer race 5, a plurality of balls 7 provided between the outer race 5 and the inner race 6 to transmit torque, and a cage 8 provided between the outer race 5 and the inner race 6 to retain the balls 7. An end portion 10*a* of a shaft 10 is press-fitted into a shaft hole inner diameter 6*a* of the inner race 6 to affect spline fitting, whereby connection with the shaft 10 is affected so as to allow torque transmission. A stop ring 9 for preventing shaft slipping-off is fitted in the end portion 10*a* of the shaft 10.

The outer race 5 includes a mouth section 11 and a stem section (shaft section) 12, and the mouth section 11 is formed in a cup-like shape open at its one end. In an inner spherical surface 13 thereof, there are formed a plurality of axially extending track grooves 14 at equal circumferential intervals. The inner race 6 has in an outer spherical surface 15 thereof a plurality of axially extending track grooves 16 formed at equal circumferential intervals.

The track grooves 14 of the outer race 5 and the track grooves 16 of the inner race 6 are paired with each other, and one ball 7 as a torque transmission element is incorporated into a ball track formed by each pair of track grooves 14 and 16 so as to be capable of rolling. The balls 7 are provided between the track grooves 14 of the outer race 5 and the track grooves 16 of the inner race 6 to transmit torque. The cage 8 is slidably provided between the outer race 5 and the inner race 6, with an outer spherical surface thereof coming into contact with the inner spherical surface 13 of the outer race 5 and an inner spherical surface thereof coming into contact with the outer spherical surface 15 of the inner race 6. While in this case the constant velocity universal joint is of the Rzeppa type, it is also possible to adopt a constant velocity universal joint of some other type such as the undercut free type, in which each of the track grooves 14 and 16 has a linear straight section provided to a groove bottom.

Further, the opening portion of the mouth section 11 is closed by a boot 18. The boot 18 includes a larger diameter portion 18*a*, a smaller diameter portion 18*b*, and a bellows portion 18*c* for coupling the larger diameter portion 18*a* and the smaller diameter portion 18*b*. The larger diameter portion 18*a* is fitted to an outside of the opening portion of the mouth section 11, and fastened with a boot band 19*a* in this state. The smaller diameter portion 18*b* is fitted to an outside of a boot mount portion 10*b* of the shaft 10, and fastened with a boot band 19*b* in this state.

Figure 3:
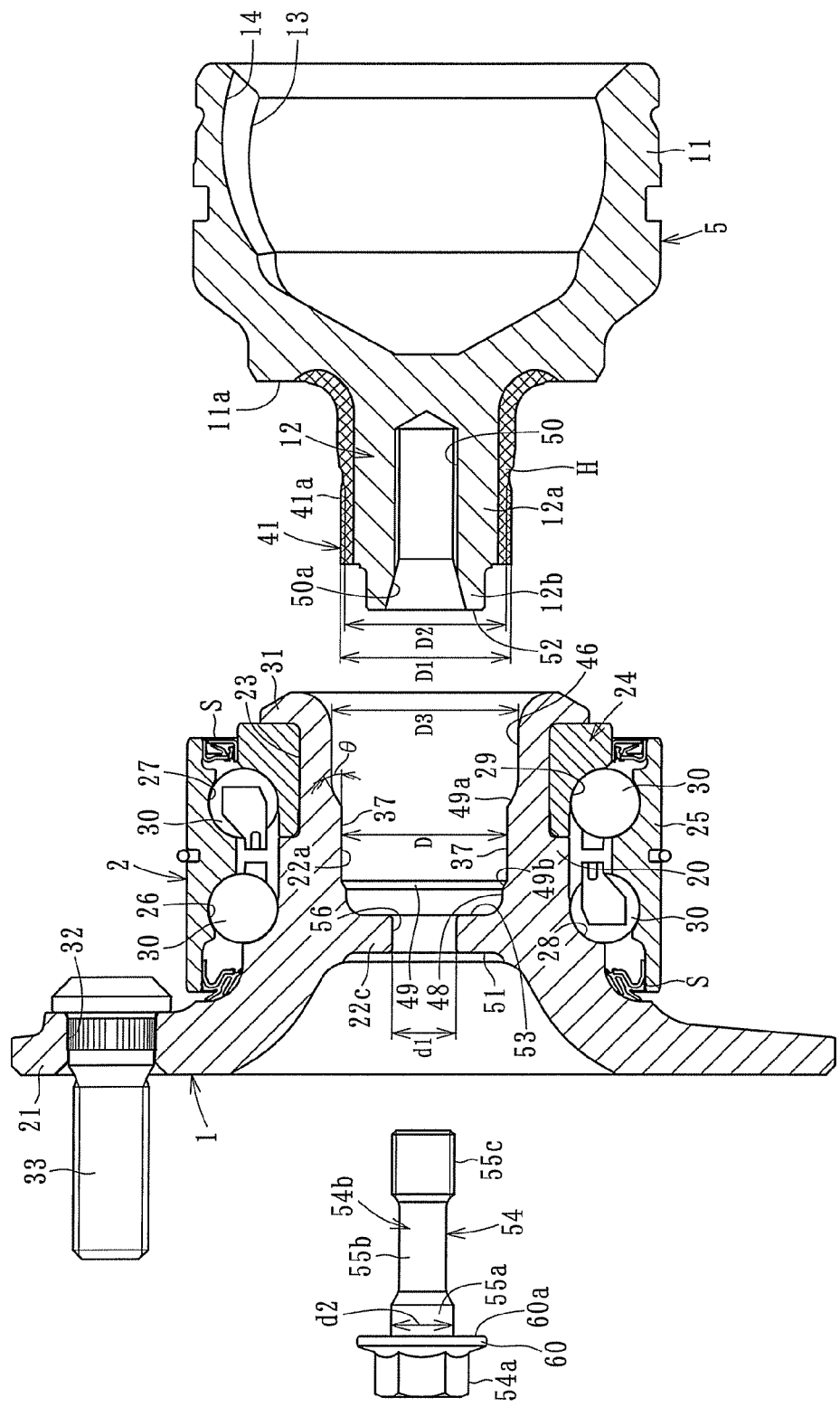
FIG. 3 A sectional view of the bearing device for a wheel prior to press-fitting.

As illustrated in FIGS. 1 and 3, the hub wheel 1 includes a cylindrical portion 20, a flange 21 provided to an end portion on an opposite joint-side of the cylindrical portion 20. A hole portion 22 of the cylindrical portion 20 includes a shaft section fitting hole 22*a*, a tapered hole 22*b* on the opposite joint-side, and an inner wall 22*c* formed between the shaft section fitting hole 22*a* and the tapered hole 22*b* and projecting in a radially inner direction. That is, in the shaft section fitting hole 22*a*, through intermediation of a recess-projection fitting structure M described later, the shaft section 12 of the outer race 5 of the constant velocity universal joint 3 and the hub wheel 1 are coupled with each other. Note that, a recessed portion 51 is provided in an end surface on an opposite shaft-portion-fitting-hole-side of the inner wall 22*c*.

The hole portion 22 includes a larger diameter portion 46 on an opening side on an opposite inner-wall-side thereof with respect to the shaft section fitting hole 22*a*, and a smaller diameter portion 48 on an inner wall side with respect to the shaft section fitting hole 22*a*. A tapered portion (tapered hole) 49*a* is provided between the larger diameter portion 46 and the shaft section fitting hole 22*a*. The tapered portion 49*a* and the shaft section fitting hole 22*a* are reduced in diameter along a press-fitting direction at the time of coupling the hub wheel 1 and the shaft section 12 of the outer race 5. A taper angle θ of the tapered portion 49*a* is set to 15° to 75°, for example. Note that a tapered portion 49*b* is similarly provided between the shaft section fitting hole 22*a* and the smaller diameter portion 48.

The roller bearing 2 includes an inner member (inner race) 24 that fit in a step section 23 provided on the joint side of the cylinder section 20 of the hub wheel 1 and an outer member 25 that is fitted to the outside of the shaft section 12 of the hub wheel 1. In the outer member 25, outer raceway surfaces (outer races) 26 and 27 in two rows are provided on an inner circumference thereof. The first outer raceway surface 26 and a first inner raceway surface (inner race) 28 provided on an outer circumference of the shaft section of the hub wheel 1 are opposed to each other. The second outer raceway surface 27 and a second inner raceway surface (inner race) 29 provided on an outer circumferential surface of the inner race 24 are opposed to each other. Balls as rolling elements 30 are interposed between the first outer raceway surface 26 and the first inner raceway surface 28 and between the second outer raceway surface 27 and the second inner raceway surface 29. Seal members S are inserted in both openings of the outer member 25. Further, a knuckle 34 (refer to FIG. 6) extending from a suspension device of a vehicle (not shown) is attached to the outer member 25, that is, the outer race.

In this case, the end on the joint side of the hub wheel 1 is forged, whereby precompression is applied to the inner member (inner race) 24 by an orbital forming section 31. Consequently, the inner race 24 can be fastened to the hub wheel 1. Further, a bolt inserting hole 32 is provided in the flange 21 of the hub wheel 1, and a hub bolt 33 for fixing a wheel and a brake rotor to the flange 21 is inserted into the bolt inserting hole 32.

A threaded hole 50 opened in an end surface on the opposite joint-side (opposite mouth-side) is provided in an axial center portion of the shaft section 12 of the outer race 5. An opening portion of the threaded hole 50 is formed as a tapered portion 50*a* opening in an enlarged manner toward the opening. Further, a smaller diameter portion 12*b* is formed at an end portion on the opposite joint-side (opposite mouth-side) of the shaft section 12. That is, the shaft section 12 includes a body portion 12*a* larger in diameter and the smaller diameter portion 12*b*.

As illustrated in FIG. 2, the recess-projection fitting structure M includes projecting portions 35 provided on the shaft section 12 and extending in the axial direction and recessed portions 36 formed in an inner surface of the hole portion 22 of the hub wheel 1 (inner surface 37 of shaft section fitting hole 22*a*, in this case). The projecting portions 35 and the recessed portions 36 of the hub wheel 1 are held in close contact with each other through intermediation of the entire region of fitting contact regions 38 therebetween, the recessed portions 36 fitting to the projecting portions 35. That is, the plurality of projecting portions 35 are arranged at predetermined pitches along a peripheral direction on an outer peripheral surface on the opposite mouth-portion-side of the shaft section 12, and the plurality of recessed portions 36 are formed along a circumferential direction which allow the projecting portions 35 to fit to an inner surface 37 of the shaft section fitting hole 22a of the hole portion 22 of the hub wheel 1. That is, over the entire circumferential direction, the projecting portions 35 and the recessed portions 36 fitting thereto tightly fit to each other.

Figure 2A:
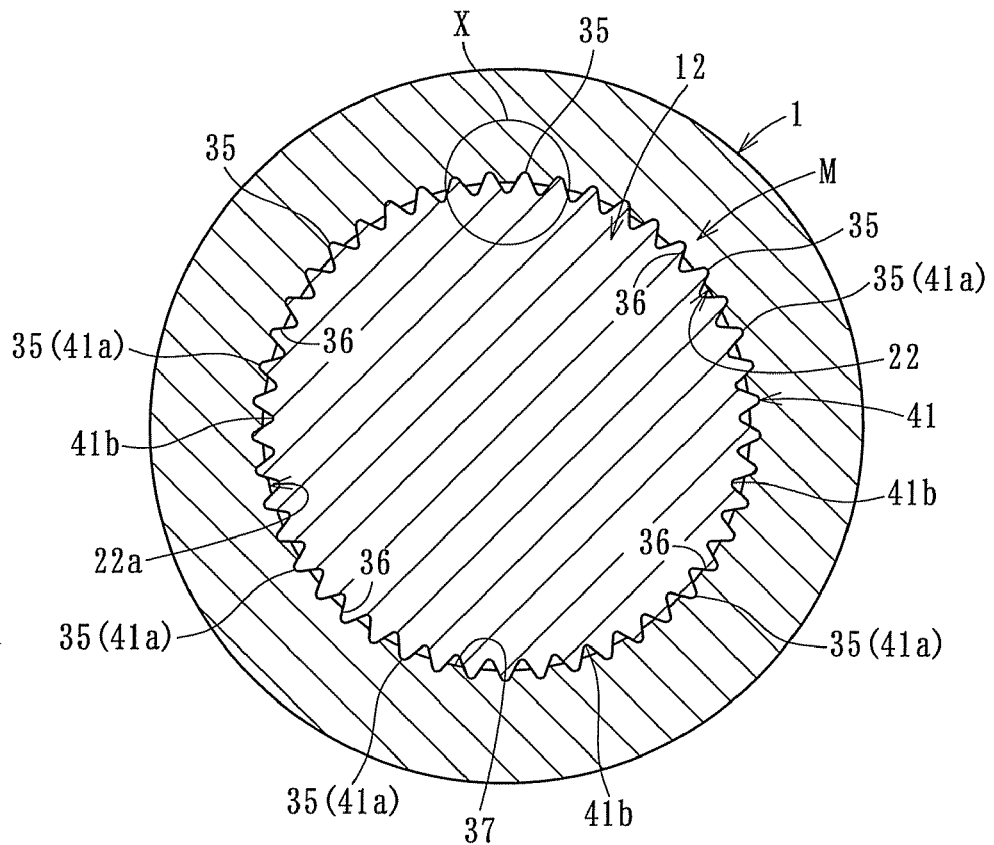
FIG. 2A An enlarged sectional view of a recess-projection fitting structure of the bearing device for a wheel.
Figure 2B:
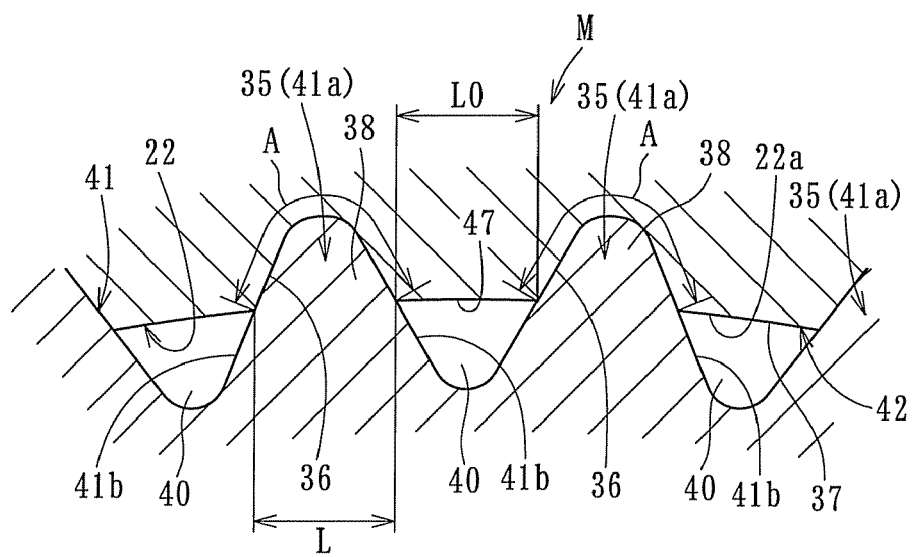
FIG. 2B An enlarged view of the X section of the recess-projection fitting structure of the bearing device for a wheel.

In this case, each of the projecting portions 35 is formed in a triangular shape (ridge shape) having a vertex of a convex round shape in cross-section, and recessed portion fitting areas of the projecting portions 35 are illustrated as ranges A in FIG. 2B, the ranges extending from a midslope portion to a summit of the ridge shape in cross-section. Further, between the projecting portions 35 adjacent to each other in the circumferential direction, gaps 40 are formed on the radially inner side with respect to the inner surface 37 of the hub wheel 1.

As described above, the hub wheel 1 and the shaft section 12 of the outer race 5 of the constant velocity universal joint 3 can be coupled with each other through intermediation of the recess-projection fitting structure M. In this case, as described above, the end portion on the joint side of the hub wheel 1 is forged, and the orbital forming section 31 thus formed applies precompression to the inner member (inner race) 24. Thus, it is unnecessary to apply precompression to the inner race 24 at the mouth section 11 of the outer race 5, and the mouth section 11 is kept out of contact with an end portion of the hub wheel 1 (orbital forming section 31, in this case). However, the mouth section 11 may be held in contact with the end portion of the hub wheel 1, and in this case, surface pressure of the contact portion is set to 100 Mpa or smaller.

Next, description is made of a fitting method for the recess-projection fitting structure M. In this case, as illustrated in FIG. 3, thermosetting treatment is effected on the outer diameter portion of the shaft section 12 so as to form a spline 41 including projecting portions 41a and recessed portions 41b along the axial direction of a hardened layer H thus formed. Thus, the projecting portions 41a of the spline 41 is subjected to thermosetting treatment, with the result that the projecting portions 41a constitute the projecting portions 35 of the recess-projection fitting structure M. The spline 41 is provided on the smaller diameter portion side of the body portion 12a of the shaft section 12. Note that, as indicated by the cross-hatched region, a range of the hardened layer H in this embodiment extends from an outer edge of the spline 41 to a part of a bottom wall of the mouth section 11 of the outer race 5. As the thermosetting treatment, there may be adopted various kinds of thermal treatment such as induction hardening or carburizing. Incidentally, the induction hardening represents quenching which utilizes a principle of inserting a part which needs to be quenched into a coil through which a high-frequency current flows and heating a conductive object with Joule heat generated by electromagnetic induction. Further, the carburizing represents quenching performed after causing carbon to intrude into a low-carbon material through a surface thereof and to disperse. The spline 41 of the shaft section 12 has small teeth having module of 0.5 or smaller. Incidentally, the module is obtained by dividing a pitch circle diameter by the number of teeth.

Further, the inner surface 37 (that is, the inner surface of the shaft section fitting hole 22a) side of the hole portion 22 of the hub wheel 1 is an unhardened section not subjected to the thermosetting treatment (in an unhardened state). A hardness difference between the hardened layer H of the shaft section 12 of the outer race 5 and the unhardened section of the hub wheel 1 is set to be equal to or larger than 20 points in HRC. Further, specifically, the hardness of the hardened layer H is set within a range of from 50 HRC to 65 HRC, and the hardness of the unhardened portion is set within a range of from 10 HRC to 30 HRC.

In this case, middle portions in a projecting direction of the projecting portions 35 corresponds to a position of a recessed portion forming surface before recess formation (in this case, inner surface 37 of the shaft section fitting hole 22a of the hole portion 22). That is, as illustrated in FIG. 3, an inner diameter dimension D of the inner surface 37 of the shaft section fitting hole 22a is set to be smaller than a maximum outer diameter of the projecting portions 35, i.e., a maximum diameter dimension (circumscribed circle diameter) D1 of a circle connecting vertexes of the projecting portions 35 as the projecting portions 41a of the spline 41 and is set to be larger than an outer diameter dimension of a shaft section outer surface among the projecting portions, i.e., a maximum diameter dimension D2 of a circle connecting bottoms of the recessed portions 41b of the spline 41. In other words, the dimensions are set in a relation of D2<D<D1. Further, the hole diameter dimension D3 of the large diameter hole 46 of the hole portion 22 is set to be smaller than D1.

The spline 41 can be formed by various machining methods such as component rolling, cutting, pressing, and drawing, which are publicly known and used conventional means. As the thermosetting treatment, various kinds of thermal treatment such as induction hardening and carburizing can be adopted.

Then, as illustrated in FIG. 3, the shaft center of the hub wheel 1 and the shaft center of the outer race 5 of the constant velocity universal joint 3 are in an aligned state. In this state, the shaft section 12 of the outer race 5 is inserted (press-fit) into the hub wheel 1. In this case, as described above, the diameter dimension D of the inner surface 37 of the shaft section fitting hole 22a, the maximum outer diameter dimension D1 of the projecting portions 35, and the minimum outer diameter dimension D2 of the recessed portions of the spline 41 are in the relation described above. Moreover, the hardness of the projecting portions 35 is larger than the hardness of the inner surface 37 by 30 points or more. Therefore, if the shaft section 12 is press-fitted into the hole portion 22 of the hub wheel 1, the projecting portions 35 bite in the inner surface 37, and the projecting portions 35 form the recessed portions 36, in which the projecting portions 35 fit, along the axial direction.

The press-fitting is continued until an end surface 52 of the smaller diameter portion 12b of the shaft section 12 comes into contact with an end surface 53c of the inner wall 22c, or until the orbital forming section 31 formed by forging the end portion on the joint side of the hub wheel 1 and a joint end surface portion 11a are brought into contact with each other (not shown). With this, as illustrated in FIGS. 2A and 2B, the projecting portions 35 on the end portion of the shaft section 12 and the recessed portions 36 fitting thereto are held in close contact with each other through intermediation of the entire of the fitting contact regions 38. That is, the shape of the projecting portions 35 is transferred onto a recessed portion formation surface on the counterpart side (inner surface 37 of shaft section fitting hole 22a of hole portion 22, in this case). In this case, the projecting portions 35 gradually bite into the inner surface 37 of the hole portion 22, and accordingly the hole portion 22 becomes slightly larger in diameter. As a result, the projecting portions 35 are allowed to move in the axial direction. When the movement thereof in the axial direction is stopped, the hole portion 22 is reduced in diameter for restoring the original diameter. In other words, the hub wheel 1 is elastically deformed in a radial direction at the time of press-fitting of the projecting portions 35. Precompression corresponding to the elastic deformation is applied to the tooth surface of the projecting portions 35 (surface of recessed portion fitting region). Thus, it is possible to reliably form the recess-projection fitting structure M in which the entire of the recessed portion fitting region of the projecting portions 35 is brought into close contact with the recessed portions 36 corresponding thereto. That is, with the spline (male spline) 41 on the shaft section 12 side, a female spline 42 brought into close contact with the male spline 41 is formed in the inner surface of the hole portion 22 of the hub wheel 1.

The recess-projection fitting structure M is formed in this manner. The recess-projection fitting structure M in this case is arranged at an immediate-underside avoiding position with respect to the raceway surfaces 26, 27, 28, and 29 of the roller bearing 2. Incidentally, the immediate-underside avoiding position represents a position of not radially corresponding to a position of a ball contact portion of each of the raceway surfaces 26, 27, 28, and 29.

Further, after the press-fitting, a bolt member 54 is screwed into a threaded hole 50 of the shaft section 12 from the opposite joint-side. As illustrated in FIG. 3, the bolt member 54 includes a flanged head portion 54a and a screw shaft section 54b. The screw shaft section 54b includes a larger-diameter proximal portion 55a, a smaller-diameter body portion 55b, and a screw portion 55c on a distal end side. In this case, a through-hole 56 is provided in the inner wall 22c, and the shaft section 54b of the bolt member 54 is inserted into the through-hole 56. With this, the screw portion 55c is screwed into the threaded hole 50 of the shaft section 12. As illustrated in FIG. 3, a hole diameter d1 of the through-hole 56 is set to be slightly larger than an outer diameter d2 of the larger-diameter proximal portion 55a of the shaft section 54b. Specifically, the diameters are set within a range of 0.05 mm<d1−d2<0.5 mm. Note that, a maximum outer diameter of the screw portion 55c is equal to an outer diameter of the larger-diameter proximal portion 55a or slightly smaller than the outer diameter of the proximal portion 55a.

By screwing the bolt member 54 into the threaded hole 50 of the shaft section 12 as described above, a flange portion 60 of the head portion 54a of the bolt member 54 is fitted to the recessed portion 51 of the inner wall 22c. With this, the inner wall 22c is sandwiched between the end surface 52 on the opposite joint-side of the shaft section 12 and the head portion 54a of the bolt member 54.

Figure 5A:
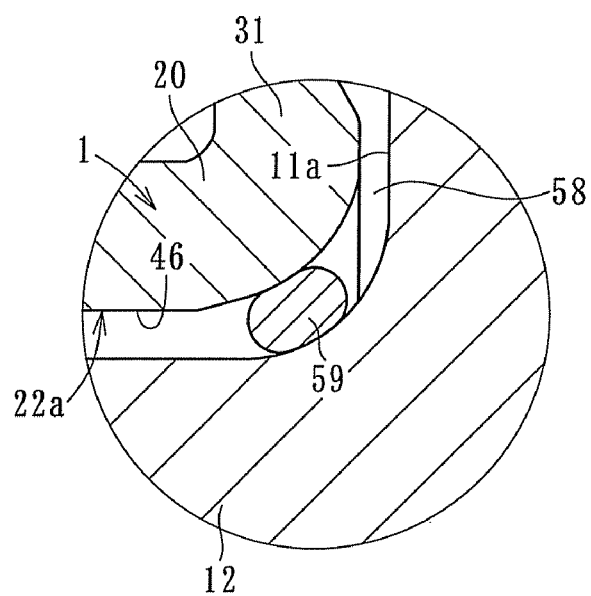
FIG. 5A An enlarged sectional view of a seal member for sealing a gap between a mouth section of an outer race and a orbital forming section of a hub wheel in the bearing device for a wheel, the seal member being an O-ring.
Figure 5B:
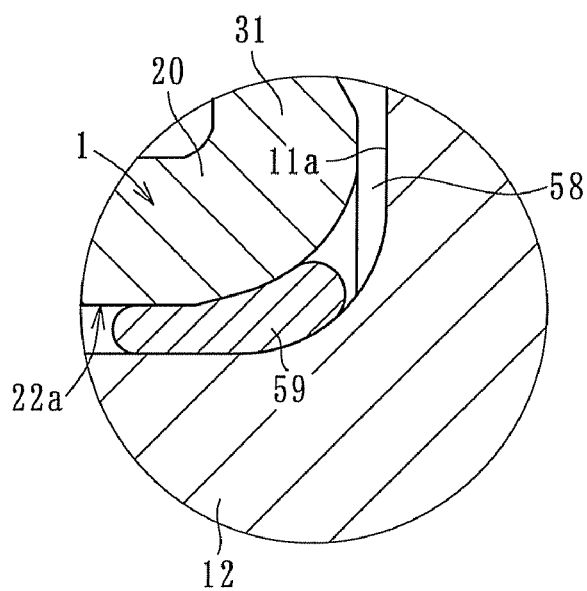
FIG. 5B An enlarged sectional view of the seal member for sealing the gap between the mouth section of the outer race and the orbital forming section of the hub wheel in the bearing device for a wheel, the seal member being a gasket.

Incidentally, in the present invention, the mouth section 11 is kept out of contact with the end portion of the hub wheel 1 (orbital forming section 31, in this case) or held in contact therewith at the surface pressure of 100 Mpa or smaller. That is, a gap 58 is formed between the orbital forming section 31 of the hub wheel 1 and the joint end surface portion 11a of the mouth section 11. Thus, as illustrated in FIGS. 5A and 5B, it is preferred to seal the gap 58 with a seal member 59. In this case, the gap 58 is formed from between the orbital forming section 31 of the hub wheel 1 and the bottom outer surface 11a of the mouth section 11 to between the shaft section fitting hole 22a and the larger diameter portion 12a of the shaft section 12. In this embodiment, the seal member 59 is arranged at a corner portion between the orbital forming section 31 of the hub wheel 1 and the larger diameter portion 12a. Note that, examples of the seal member 59 include one such as the O-ring as illustrated in FIG. 5A, and one such as the gasket as illustrated in FIG. 5B.

Further, a seal member (not shown) may be interposed also between a bearing surface 60a of the bolt member 54 and the inner wall 22c. In this case, for example, a seal member (sealing agent) may be applied to the bearing surface 60a of the bolt member 54, the seal member (sealing agent) being made of various resins capable of exerting, by curing after application, sealing performance between the bearing surface 60a and a bottom surface of the recessed portion 51 of the inner wall 22c. Note that, a seal member free of deterioration in an atmosphere in which the bearing device for a wheel is used is selected as the seal member.

Thus, in the present invention, the entire fitting contact regions 38 of the projecting portions 35 of the shaft portion 12 and the recessed portions 36 of the hub wheel 1 are brought into close contact with each other so as to reliably form the recess-projection fitting structure M. Moreover, it is unnecessary to form spline sections and the like in a member in which the recessed portions 36 are formed. The bearing device for a wheel is excellent in productivity. Further, phase alignment of the splines is unnecessary. It is possible to realize improvement of assembly property, prevent damage to the tooth surfaces during press-fitting, and maintain a stable fitting state.

Further, in the recess-projection fitting structure M, the entire regions of the fitting contact regions 38 between the projecting portions 35 and the recessed portions 36 are held in close contact, and hence a gap in which a backlash occurs is not formed in a diameter direction and a circumferential direction. Thus, the entire fitting regions contribute to rotation torque transmission, and stable torque transmission is possible. In addition, abnormal noise is not generated.

Further, when the shaft section 12 of the outer race 5 is press-fitted into the hole portion 22 of the hub wheel 1, the tapered section 49a for centering can constitute a guide at the start of press-fitting. Thus, it is possible to press-fit the shaft section 12 of the outer race 5 into the hole portion 22 of the hub wheel 1 without causing decentering to thereby perform stable torque transmission.

Note that, in the case where the tapered section 49a is not formed in the hole portion 22 of the hub wheel 1, centering can not be performed when the shaft section 12 of the outer race 5 is press-fitted into the hole portion 22 of the hub wheel 1, and hence there is a risk of causing decentering and center inclination between the hub wheel 1 and the outer race 5 of the constant velocity universal joint 3. Therefore, it is preferred to set the inclination angle θ (see FIG. 3) of the tapered section 49a to 15° to 75° as described above. That is, if the inclination angle is less than 15°, the tapered section 49a can exert a function as the guide. However, the axial length of the tapered section 49a is elongated, whereby operability of press-fitting is deteriorated, and there is a risk that the axial length of the hub wheel 1 is elongated. Further, if the inclination angle exceeds 75°, there is a risk of causing decentering.

Figure 4:
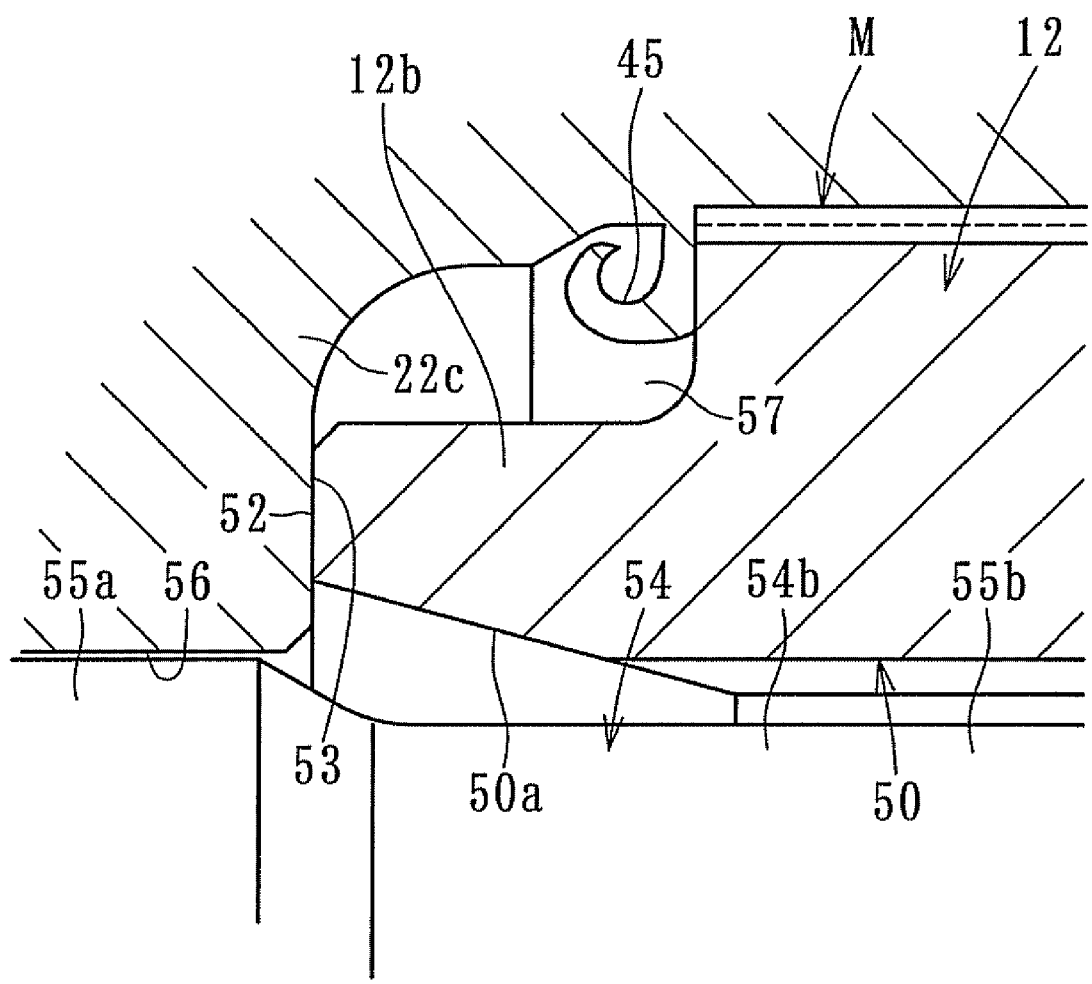
FIG. 4 An enlarged view of a main part of the bearing device for a wheel.

Incidentally, when the shaft section 12 is press-fitted into the hole portion 22 of the hub wheel 1, as illustrated in FIG. 4, an extruded portion 45 to be formed is housed while curling in the housing section 57 corresponding to a space provided on the outer diameter side of the smaller diameter portion 12b of the shaft section 12. In this case, the extruded portion 45 includes a part of material having a volume equal to that of the recessed portions 36 into (to) which the projecting portions 35 are fitted, the part thereof being subjected to the following: forcing-out corresponding to the amount of the recessed portions 36 to be formed; trimming for forming the recessed portions 36; forcing-out and trimming simultaneously performed; or the like. Thus, the extruded portion 45 including the part of the material chipped or forced-out from the inner surface of the hole portion 22 gradually intrudes into the inside of the housing section 57.

By providing the housing section 57 for housing the extruded portion 45 caused by recess formation by the press-fitting, it is possible to hold (maintain) the extruded portion 45 in this housing section 57. Therefore, the extruded portion 45 does not enter the inside of the vehicle and the like on the outside of the device. In other words, the extruded portion 45 can be kept housed in the housing section 57. It is unnecessary to perform removal processing for the extruded portion 45. Therefore, it is possible to realize a reduction in the number of worker-hours for assembly and realize improvement of assembly operability and cost reduction.

As a result of bolt fixation, the shaft section 12 is regulated from being detached from the hub wheel 1 in the axial direction, and hence stable torque transmission is enabled over a long period of time. In particular, it is possible to achieve the following: stabilization of bolt fixation as a result of the provision of the inner wall 22c sandwiched between the end surface 52 on the opposite joint-side of the shaft section 12 of the outer race 5 and the head portion 54a of the bolt member 54; stabilization of dimensional accuracy of the bearing device for a wheel as a result of the positioning; and stable securement of the axial length of the recess-projection fitting structure M arranged in the axial direction. As a result, torque transmission properties can be increased.

Further, the end portion of the hub wheel 1 is forged so as to apply precompression to the inner race 24 of the roller bearing 2, and hence it is unnecessary to apply precompression to the inner race from the mouth section 11 of the outer race 5. Thus, without consideration of precompression to the inner race 24, the shaft section 12 of the outer race 5 can be press-fitted, and coupling properties (assembly properties) of the hub wheel 1 and the outer race 5 can be improved. The mouth section 11 is kept out of contact with the hub wheel 1, or held in contact therewith at low surface pressure. Thus, it is possible to prevent generation of abnormal noise due to contact between the mouth section 11 and hub wheel 1.

The gap 58 between the mouth section 11 of the outer race 5 and the orbital forming section 31 formed by forging the end portion of the hub wheel 1 is sealed with the seal member 59. Thus, it is possible to prevent intrusion of rainwater and foreign matters from the gap 58, and hence possible to avoid deterioration in close contact property caused by rainwater, foreign matters, and the like to the recess-projection fitting structure M. A seal member is interposed between the bearing surface 60a of the bolt member 54 for performing bolt fixation of the hub wheel 1 and the shaft section 12 of the outer race 5, and the inner wall 22c, and hence it is possible to prevent rainwater and foreign matters from intruding into the recess-projection fitting structure M from the bolt member 54. As a result, quality of the bearing device for a wheel can be improved.

Further, the projecting portions 35 are arranged so as to position middle portions in a projecting direction thereof on a recessed-portion formation surface prior to formation of the recessed portions. With this, the projecting portions 35 gradually bite into the recessed-portion formation surface at the time of press-fitting, and hence the recessed portions 36 can be reliably formed. That is, it is possible to sufficiently secure press-fitting allowance of the projecting portions 35 with respect to the counterpart side. With this, the following can be achieved: stabilization of moldability of the recess-projection fitting structure M, reduction of nonuniformity in press-fitting load, and stable torsional strength.

In the embodiment illustrated, for example, in FIG. 1, the projecting portions 35 of the recess-projection fitting structure M are provided on the shaft section 12 of the outer race 5, the hardness of the axial end portion of the projecting portions 35 is set to be higher than that of the radially inner portion of the hole portion of the hub wheel 1, and the shaft section 12 is press-fitted into the hole portion 22 of the hub wheel 1. With this, it is possible to increase the hardness on the shaft section side, and possible to increase the strength of the shaft section.

By arranging the recess-projection fitting structure M at the immediate-underside avoiding position with respect to the raceway surfaces of the roller bearing 2, hoop stress on the bearing raceway surfaces is suppressed. With this, it is possible to prevent occurrence of failures with a bearing, such as reduction of rolling fatigue life, occurrence of cracks, and stress corrosion crack, and hence possible to provide a bearing 12 of high quality.

As described above in this embodiment, the spline 41 formed on the shaft section 12 has small teeth having module of 0.5 or smaller. Thus, it is possible to improve moldability of the spline 41 and to reduce press-fitting load. Note that, it is possible to constitute the projecting portions 35 by the spline normally formed on the shaft of this type, and hence possible to easily form the projecting portions 35 at low cost.

In the spline 41 illustrated in FIG. 2, a pitch of the projecting portions 41a and a pitch of the recessed portions 41b are set to be equal to each other. Thus, as described above in this embodiment, as illustrated in FIG. 2B, a circumferential thickness L of the middle portions in the projecting direction of the projecting portions 35, and a circumferential dimension L0 in a position corresponding to the middle portions between the projecting portions 35 adjacent to each other in the circumferential direction are substantially equal to each other.

Figure 8:
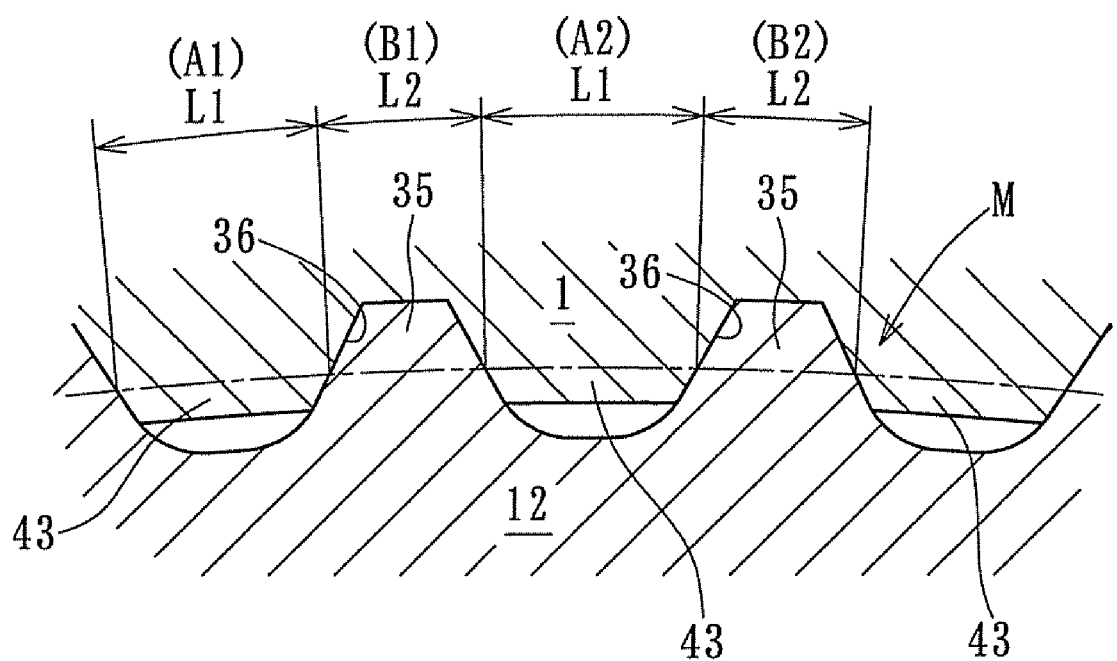
FIG. 8 A sectional view of a modification of the recess-projection fitting structure.

Meanwhile, as illustrated in FIG. 8, a circumferential thickness L2 of the middle portions in the projecting direction of the projecting portions 35 may be smaller than a circumferential dimension L1 in a position corresponding to the middle portions between the projecting portions 35 adjacent to each other in the circumferential direction. That is, in the spline 41 formed on the shaft section 12, the circumferential thickness (tooth thickness) L2 of the middle portions in the projecting direction of the projecting portions 35 is set to be smaller than the circumferential thickness (tooth thickness) L1 of middle portions in a projecting direction of projecting portions 43 on the hub wheel 1 side, the projecting portions 43 fitting in between the projecting portions 35.

Therefore, a sum $\Sigma(B1+B2+B3+\ldots)$ of tooth thicknesses of the projecting portions 35 in the entire circumference on the shaft section 12 side is set to be smaller than a sum $\Sigma(A1+A2+A3+\ldots)$ of tooth thicknesses of the projecting portions 43 (projecting teeth) on the hub wheel 1 side. With this, it is possible to increase a shearing area of the projecting portions 43 on the hub wheel 1 side and to secure torsional strength. In addition, the tooth thickness of the projecting portions 35 is small, and hence it is possible to reduce press-fitting load and to achieve improvement of press-fitting properties. When a sum of circumferential thicknesses of the projecting portions 35 is set to be smaller than a sum of circumferential thicknesses of the projecting portions on the counterpart side, it is unnecessary to set the circumferential thickness L2 of all the projecting portions 35 to be smaller than the circumferential dimension L1 between the projecting portions 35 adjacent to each other in the circumferential direction. That is, even when a circumferential thickness of arbitrary projecting portions 35 among the plurality of projecting portions 35 are equal to or larger than a dimension in the circumferential direction between the projecting portions adjacent to each other in the circumferential direction, a sum of circumferential thicknesses only has to be smaller than a sum of dimensions in the circumferential direction. Note that, the projecting portions 35 in FIG. 8 have a trapezoidal shape (shape of Mt. Fuji) in cross-section.

Incidentally, when the bolt member 54 is detached by being screwed backward from the state illustrated in FIG. 1, the outer race 5 can be pulled out from the hub wheel 1. That is, a fitting force of the recess-projection fitting structure M is set to an extent that the hub wheel 1 can be pulled out by applying a pulling-out force larger than a predetermined force to the outer race 5.

For example, the hub wheel 1 and the constant velocity universal joint 3 are separated from each other with a jig 70 illustrated in FIG. 6. The jig 70 includes a base 71, a pressing bolt member 73 engaged with a threaded hole 72 of the base 71 so as to be screwed forward/backward, and a screw shaft 76 threadedly engaged with the threaded hole 50 of the shaft section 12. A through-hole 74 is provided in the base 71, and a bolt 33 of the hub wheel 1 is inserted into the through-hole 74 so that a nut member 75 is threadedly engaged with the bolt 33. In this case, the base 71 and the flange 21 of the hub wheel 1 are superimposed on each other, and the base 71 is attached to the hub wheel 1.

After the attachment of the base 71 to the hub wheel 1 in this manner or before the attachment of the base 71 thereto, the screw shaft 76 is threadedly engaged with the threaded hole 50 of the shaft section 12 so as to protrude the proximal portion 76a from the inner wall 22c to the opposite joint-side. A projecting amount of the proximal portion 76a is set to be larger than the axial length of the recess-projection fitting structure M. The screw shaft 76 and the pressing bolt member 73 are arranged coaxially with each other (coaxially with the bearing device for a wheel).

After that, as illustrated in FIG. 6, the pressing bolt member 73 is screwed into the threaded hole 72 of the base 71 from the opposite joint-side, and in this state, is screwed forward to the screw shaft 76 as indicated by the arrow. In this case, the screw shaft 76 and the pressing bolt member 73 are arranged coaxially with each other (coaxially with the bearing device for a wheel), and hence the pressing bolt member 73 presses the screw shaft 76 in the arrow direction as a result of the forward screwing. With this, the outer race 5 is moved in the arrow direction with respect to the hub wheel 1, and the outer race 5 is detached from the hub wheel 1.

Figure 7:
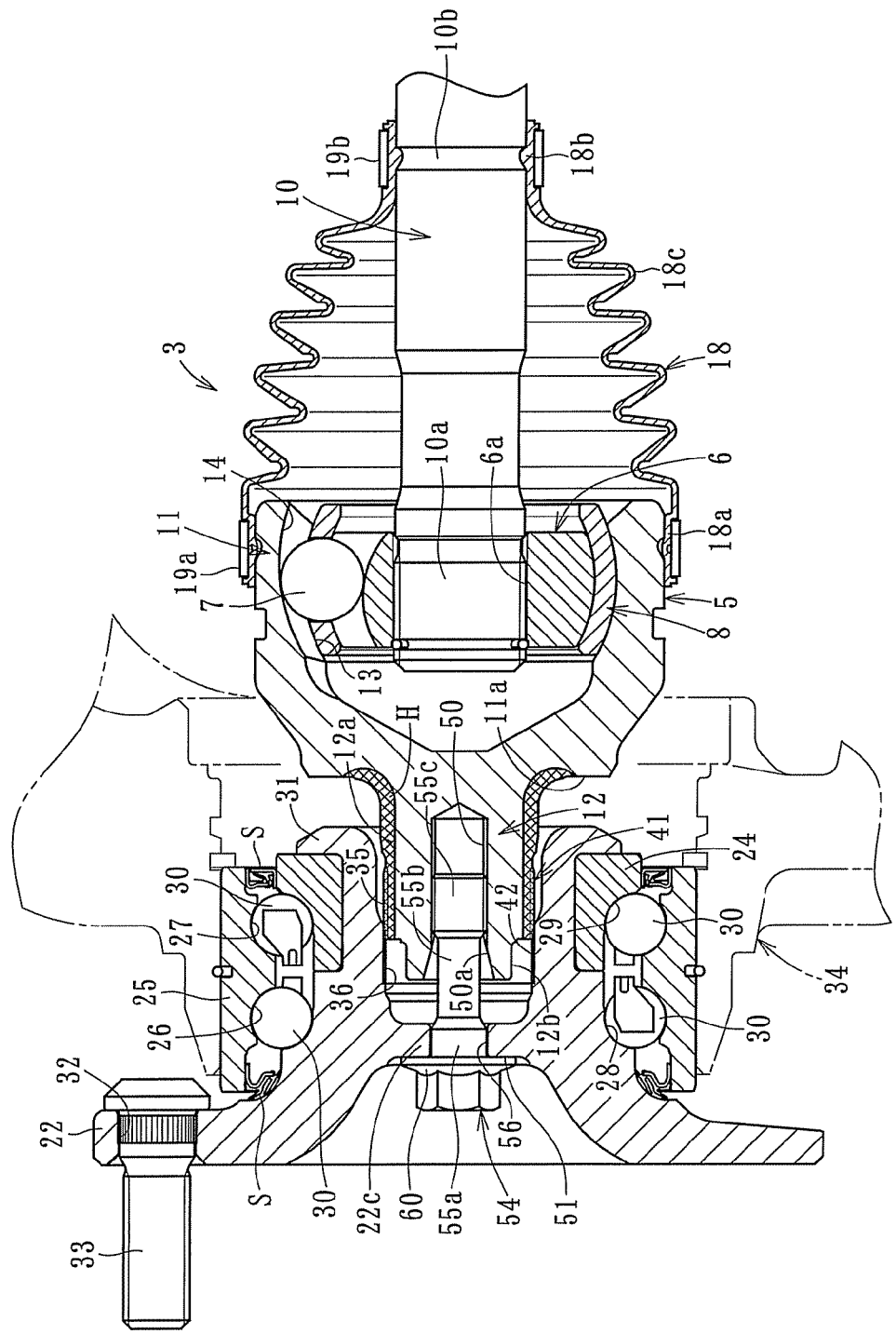
FIG. 7 A sectional view of a re-press-fitting method.

Further, in the state in which the outer race 5 is detached from the hub wheel 1, the hub wheel 1 and the outer race 5 can be re-coupled with each other with use of, for example, the bolt member 54. That is, in the state in which the base 71 is detached from the hub wheel 1 and the screw shaft 76 is disengaged from the shaft section 12, as illustrated in FIG. 7, the bolt member 54 is threadedly engaged with the threaded hole 50 of the shaft section 12 through the through-hole 56. In this state, the male spline 41 on the shaft section 12 side and the female spline 42 of the hub wheel 1 are aligned in phase with each other, the female spline 42 being formed by previous press-fitting.

In this state, the bolt member 54 is screwed forward with respect to the threaded hole 50. With this, the shaft section 12 is gradually fitted into the hub wheel 1. In this case, the hole portion 22 becomes slightly larger in diameter so as to allow the shaft section 12 to move in the axial direction. When the movement thereof in the axial direction is stopped, the hole portion 22 is reduced in diameter by restoring the original diameter. With this, similarly to the previous press-fitting, it is possible to reliably form the recess-projection fitting structure M in which the entire of the recessed portion fitting regions of the projecting portions 35 is held in close contact with the recessed portions 36 corresponding thereto.

In particular, when the bolt member 54 is screwed forward with respect to the threaded hole 50, a proximal portion 55a of the bolt member 54 corresponds to the through-hole 56 as illustrated in FIG. 7. In addition, the hole diameter d1 of the through-hole 56 is set to be slightly larger than the outer diameter d2 of the larger-diameter proximal portion 55a of the shaft section 54b. (Specifically, the diameters are set within a range of 0.05 mm<d1−d2<0.5 mm.) Thus, with use of the outer diameter of the proximal portion 55a of the bolt member 54 and the inner diameter of the through-hole 56, it is possible to form a guide along which the bolt member 54 is screwed forward into the threaded hole 50, and hence possible to press-fit the shaft section 12 into the hole portion 22 of the hub wheel 1 without causing decentering. Note that, when the axial length of the through-hole 56 is excessively short, stable guiding cannot be effected, and in contrast, when the axial length of the through-hole 56 is excessively long, the axial length of the recess-projection fitting structure M cannot be secured and the weight of the hub wheel 1 is increased owing to an increase in thickness dimension of the inner wall 22c. Thus, various modifications may be made in consideration of those factors.

Note that, the opening portion of the threaded hole 50 of the shaft section 12 is formed as the tapered portion 50a opening in an enlarged manner toward the opening. Thus, there is an advantage that the screw shaft 76 and the bolt member 54 are easily and threadedly engaged with the screw hole 50.

Incidentally, at the time of first press-fitting (press-fitting for molding recessed portions 36 in inner surface 37 of hole portion 22), press-fitting load is relatively large. Thus, it is necessary to use press machines or the like for the press-fitting. In contrast, at the time of the re-press-fitting, press-fitting load is smaller than the press-fitting load at the time of the first press-fitting. Thus, without use of the press machines or the like, it is possible to stably and accurately press-fit the shaft section 12 into the hole portion 22 of the hub wheel 1. Thus, the outer race 5 and the hub wheel 1 can be separated and coupled with respect to each other on site.

As described above, the outer race 5 can be detached from the hole portion 22 of the hub wheel 1 by application of the pulling-out force in the axial direction to the shaft section 12 of the outer race 5. Thus, it is possible to improve operability in repair and inspection of the components (maintenance property). In addition, by re-press-fitting the shaft section 12 of the outer race 5 into the hole portion 22 of the hub wheel 1 after the repair and inspection of the components, it is possible to form the recess-projection fitting structure M in which the projecting portions 35 and the recessed portions 36 are held in close contact with each other through intermediation of the entire region of the fitting contact regions 38. Thus, it is possible to re-structure a bearing device for a wheel capable of performing stable torque transmission.

Figure 9A:
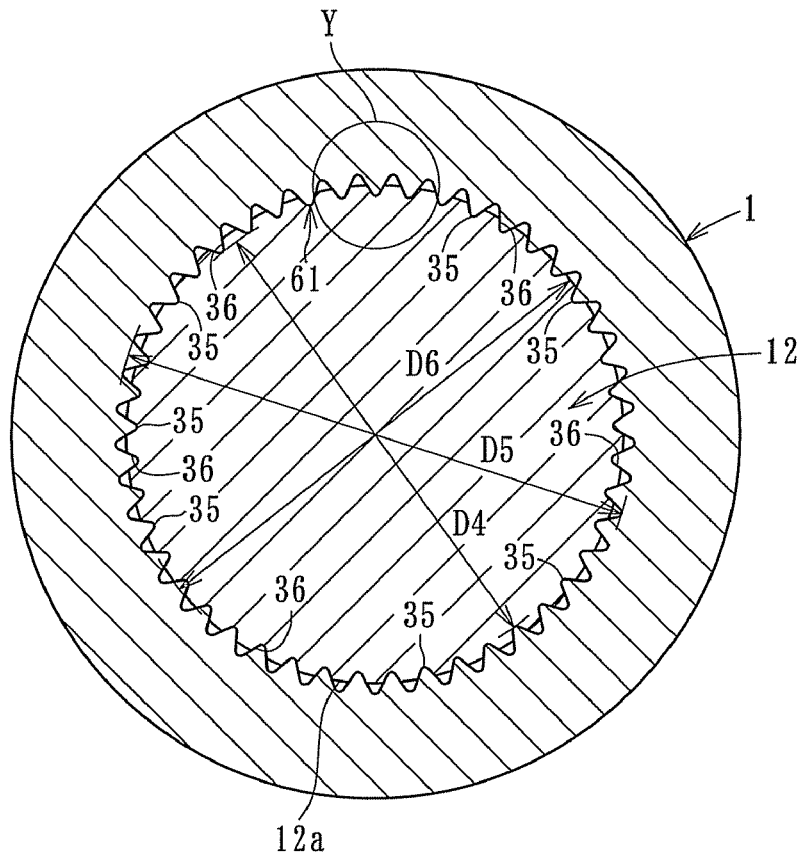
FIG. 9A A lateral sectional view of a bearing device for a wheel according to a second embodiment of the present invention.

Incidentally, in each of the embodiments, the spline 41 constituting the projecting portions 35 is formed on the shaft section 12 side. Hardening treatment is performed on this spline 41 of the shaft section 12 and the inner surface of the hub wheel 1 is not hardened (raw material). Meanwhile, as illustrated in FIG. 9, a spline 61 (including projected streaks 61a and recessed streaks 61b) subjected to hardening treatment may be formed on the inner surface of the hole portion 22 of the hub wheel 1, and hardening treatment may not be performed on the shaft section 12. Note that, the spline 61 can also be formed by various machining methods such as broaching, cutting, pressing, and drawing, which are publicly known and used as conventional means. Further, as the thermosetting treatment, various kinds of thermal treatment such as induction hardening or carburizing can be adopted.

In this case, the middle portions in a projecting direction of the projecting portions 35 correspond to the position of the recessed-portion forming surface (outer surface of shaft section 12) before recess formation. That is, the diameter dimension (minimum diameter dimension of projecting portions 35) D4 of a circle connecting vertexes of the projecting portions 35 as the projecting portions 61a of the spline 61 is set to be smaller than an outer diameter dimension D6 of the shaft section 12. A diameter dimension (inner diameter dimension of inner surface of fitting holes between projecting portions) D5 of a circle connecting bottoms of the recessed portions 61b of the spline 61 is set to be larger than the outer diameter dimension D6 of the shaft section 12. In other words, the dimensions are set in a relation of D4<D6<D5.

When the shaft section 12 is press-fitted into the hole portion 22 of the hub wheel 1, by the projecting portions 35 on the hub wheel 1 side, the recessed portions 36, in which the projecting portions 35 fit, can be formed in the outer circumferential surface of the shaft section 12. Thus, the entire fitting contact regions 38 between the projecting portions 35 and the recessed portions that fit on the projecting portions 35 are brought into close contact with each other.

Figure 9B:
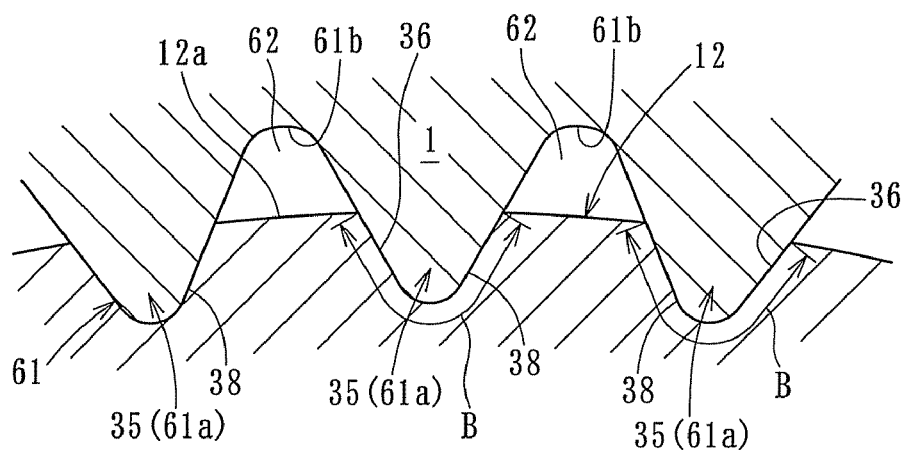
FIG. 9B An enlarged lateral sectional view of a main part of the bearing device for a wheel according to the second embodiment of the present invention.
Figure 10:
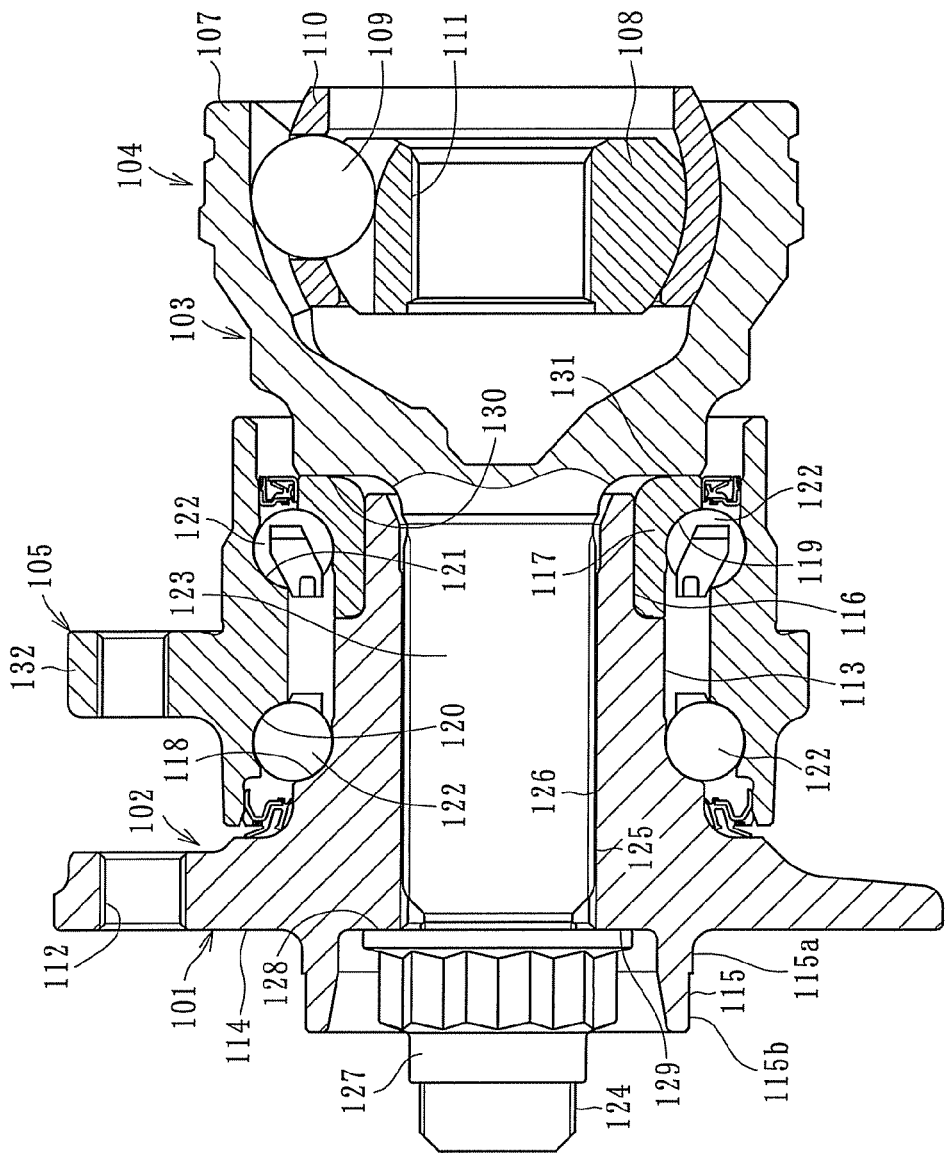
FIG. 10 A sectional view of a conventional bearing device for a wheel.

Here, the fitting contact regions 38 are ranges B illustrated in FIG. 9B and ranges from halfway sections to the tops of the ridges in section of the projecting portions 35. Further, a gap 62 is formed on the outer surface side with respect to the outer circumferential surface of the shaft section 12 between the projecting portions 35 adjacent to each other in the circumferential direction.

Even in this case, the extruded portion 45 is formed by press-fitting. Therefore, it is preferred to provide the housing section 57 that stores this extruded portion 45. The extruded portion 45 is formed on the mouth side of the shaft section 12, and hence the housing section is provided on the hub wheel 1 side.

In the above description, the projecting portions 35 of the recess-projection fitting structure M are provided on the inner surface 37 of the hole portion 22 of the hub wheel 1, and the hardness of the axial end portion of the projecting portions 35 is set to be higher than that of the radially outer portion of the shaft section 12 of the outer race 5, and press-fitting is performed. With this, it is unnecessary to perform hardness treatment (thermal treatment) on the shaft section side, and hence the outer joint member (outer race 5) of the constant velocity universal joint is excellent in productivity.

In the above description, the embodiments of the present invention are described. However, the present invention is not limited to the embodiments and various modifications of the embodiments are possible. For example, the shape of the projecting portions 35 of the recess-projection fitting structure M is triangular in section in the embodiment illustrated in FIG. 2 and is trapezoidal (shape of Mt. Fuji) in section in the embodiment illustrated in FIG. 8. Besides, projecting portions of various shapes such as a semicircular shape, a semi-elliptical shape, and a rectangular shape can be adopted. An area, the number, and a circumferential direction arranging pitch, and the like of the projecting portions 35 can also be arbitrarily changed. In other words, it is unnecessary to form the spline 41 and form the projecting portions (projected teeth) 41a of this spline 41 as the projecting portions 35 of the recess-projection fitting structure M. The projecting portions 35 may be something like keys or may form wavy mating surfaces of a curved line shape. In short, it is sufficient that the projecting portions 35 arranged along the axial direction are press-fitted into the counterpart side, the recessed portions 36 adhering to and fitting on the projecting portions 35 can be formed on the counterpart side by the projecting portions 35, the entire fitting contact regions 38 of the projecting portions 35 and the recessed portions that fit on the projecting portions 35 are brought into close contact with each other, and rotation torque can be transmitted between the hub wheel 1 and the constant velocity universal joint 3.

Further, the hole portion 22 of the hub wheel 1 may be a deformed-shape hole such as a polygonal hole other than a circular hole. A sectional shape of the end portion of the shaft section 12 fit and inserted into this hole portion 22 may be a deformed-shape section such as a polygon section other than a circular section. Moreover, when the shaft section 12 is press-fitted into the hub wheel 1, it is sufficient that only press-fitting start end portions of the projecting portions 35 have hardness higher than that of the regions where the recessed portions 36 are formed. Therefore, it is unnecessary to set the hardness of the entire projecting portions 35 high. In FIG. 2 and the like, the gap 40 is formed. However, the projecting portions 35 may bite in the inner surface 37 of the hub wheel 1 up to the recessed portions among the projecting portions 35. Note that, as a hardness difference between the projecting portions 35 side and the side of the recessed-portion formation surface formed by the projecting portions 35, as described above, it is preferred to set the hardness difference to be equal to or larger than 30 points in HRC. As long as the projecting portions 35 can be press-fitted, however, the hardness difference may be smaller than 30 points.

The end surfaces (press-fitting start ends) of the projecting portions 35 are the surfaces orthogonal to the axial direction in the embodiments. However, the end surfaces may be surfaces tilting at a predetermined angle with respect to the axial direction. In this case, the end surfaces may tilt to the opposite projecting portion side from the inner surface side to the outer surface side or may tilt to the projecting portion side.

In addition, in the inner surface 37 of the hole portion 22 of the hub wheel 1, there may be provided small recessed portions arranged at a predetermined pitch along the circumferential direction. The small recessed portions need to have a volume smaller than that of the recessed portions 36. By providing the small recessed portions as described above, it is possible to achieve improvement of press-fitting properties of the projecting portions 35. That is, by providing the small recessed portions, it is possible to reduce the volume of the extruded portion 45 formed during press-fitting of the projecting portions 35, and to achieve reduction in press-fitting resistance. Further, it is possible to reduce the size of the extruded portion 45, and hence to reduce the volume of the housing section 57, and to realize improvement of processability of the housing section 57 and strength of the shaft section 12. Note that, the small recessed portions may have various shapes such as a semi-elliptical shape and a rectangular shape, and the number of the small recessed portions can be arbitrarily set.

Rollers may be used as the rolling elements 30 of the bearing 2. Further, as described above in this embodiment, while a bearing device for a wheel of a third generation is illustrated, ones of first, second, and fourth generations may be used. Note that, when press-fitting the projecting portions 35, a member on which the projecting portions 35 are formed may be moved, with a member in which the recessed portions 36 are formed being stationary. Conversely, the member in which the recessed portions 36 are formed may be moved, with the member on which the projecting portions 35 are formed being stationary. Both of them may be moved. Note that in the constant velocity universal joint 3, the inner race 6 and the shaft 10 may be integrated with each other through an intermediation of the recess-projection fitting structure M described in each of the embodiments.

As described above in this embodiment, as the seal member interposed between the bearing surface 60a of the bolt member 54 for performing bolt fixation of the hub wheel 1 and the shaft section 12 and the inner wall 22c, a resin is applied on the bearing surface 60a side of the bolt member 54. In contrast, the resin may be applied on the inner wall 22c side. Alternatively, the resin may be applied on the bearing surface 60a side and the inner wall 22c side. Note that, at the time of screwing the bolt member 54, when the bearing surface 60a of the bolt member 54 and the bottom surface of the recessed portion 51 of the inner wall 22c are excellent in close contact property, the seal member as described above may be omitted. That is, by trimming the bottom surface of the recessed portion 51, it is possible to improve close contact property thereof with respect to the bearing surface 60a of the bolt member 54. As a matter of course, in the state of being finished by so-called lathe-turning without trimming the bottom surface of the recessed portion 51, the seal member may be omitted as long as close contact property can be exerted.

INDUSTRIAL APPLICABILITY

The present invention can be used in a bearing device for a wheel for supporting wheels to freely rotate relative to a vehicle body in a vehicle such as an automobile.

The invention claimed is:

1. A bearing device for a wheel, comprising:
a hub wheel;
a double-row roller bearing;
a constant velocity universal joint, the hub wheel, the double-row roller bearing, and the constant velocity universal joint being unitized together; and
a recess-projection fitting structure through intermediation of which the hub wheel and a shaft section of an outer joint member of the constant velocity universal joint are separably coupled with each other, the shaft section being inserted in a fitting manner into a hole portion of the hub wheel,
wherein the recess-projection fitting structure comprises:
projecting portions provided on one of an outer surface of the shaft section of the outer joint member and an inner surface of the hole portion of the hub wheel and extending in an axial direction, the projecting portions being press-fitted along the axial direction into another of the outer surface of the shaft section of the outer joint member and the inner surface of the hole portion of the hub wheel; and
recessed portions formed with the projecting portions so as to be held in close contact with the projecting portions in a fitting manner on the another of the outer surface of the shaft section of the outer joint member and the inner surface of the hole portion of the hub wheel, the projecting portions and the recessed portions being held in close contact with each other through intermediation of an entire region of fitting contact regions therebetween, the recess-projection fitting structure allowing separation by being applied with a pulling-out force in the axial direction.

2. The bearing device for a wheel according to claim 1, wherein the hub wheel and the shaft section of the outer joint member are subjected to bolt fixation with a bolt member threadedly engaged with a threaded hole formed at a shaft center portion of the shaft section of the outer joint member along the axial direction.

3. The bearing device for a wheel according to claim 2, wherein a seal material is interposed between a bearing surface of the bolt member and an inner wall, the bolt member performing the bolt fixation of the hub wheel and the shaft section of the outer joint member.

4. The bearing device for a wheel according to claim 2, wherein a sum of circumferential thicknesses of middle portions in a projecting direction of the projecting portions is set to be smaller than a sum of circumferential thicknesses in positions corresponding to the middle portions in projecting portions on a fitting counterpart side in between the projecting portions adjacent to one another in a circumferential direction.

5. The bearing device for a wheel according to claim 2, further comprising, in a bolt fixation state of the hub wheel and the shaft section of the outer joint member, an inner wall for a bearing surface of the bolt member, the inner wall being provided in the hole portion of the hub wheel.

6. The bearing device for a wheel according to claim 5, wherein a sum of circumferential thicknesses of middle portions in a projecting direction of the projecting portions is set to be smaller than a sum of circumferential thicknesses in positions corresponding to the middle portions in projecting portions on a fitting counterpart side in between the projecting portions adjacent to one another in a circumferential direction.

7. The bearing device for a wheel according to claim 1, wherein:
the outer joint member comprises:
a mouth section in which an inner joint member is mounted; and
the shaft section protruding from a bottom portion of the mouth section; and
an end portion of the hub wheel is forged so as to apply precompression to an inner race of the double-row roller bearing fitted to an outside of the hub wheel.

8. The bearing device for a wheel according to claim 7, further comprising a gap formed between the mouth section of the outer joint member and an orbital forming section formed by forging the end portion of the hub wheel.

9. The bearing device for a wheel according to claim 8, further comprising a seal member arranged for sealing the gap formed between the mouth section of the outer joint member and the orbital forming section of the hub wheel.

10. The bearing device for a wheel according to claim 7, wherein a sum of circumferential thicknesses of middle portions in a projecting direction of the projecting portions is set to be smaller than a sum of circumferential thicknesses in positions corresponding to the middle portions in projecting portions on a fitting counterpart side in between the projecting portions adjacent to one another in a circumferential direction.

11. The bearing device for a wheel according to claim 1, wherein the projecting portions of the recess-projection fitting structure are provided on the outer surface of the shaft section of the outer joint member, and the recessed portions, which are held in close contact with the projecting portions in the fitting manner, are formed with the projecting portions on the inner surface of the hole portion of the hub wheel by setting at least a hardness of axial end portions of the projecting portions to be higher than that of an inner portion of the hole portion of the hub wheel, and by press-fitting the shaft section into the hole portion of the hub wheel from a side of the axial end portions of the projecting portions, whereby the recess-projection fitting structure is formed.

12. The bearing device for a wheel according to claim 11, wherein further comprising a housing section for housing an extruded portion caused by formation of the recessed portions by the press-fitting provided on an outer side of the shaft section on an opposite joint side with respect to the recess-projection fitting structure.

13. The bearing device for a wheel according to claim 12, wherein an inner diameter dimension of the inner surface of the hole portion of the hub wheel is set to be smaller than a maximum radial dimension of a circle formed by connecting vertexes of the projecting portions, and to be larger than a maximum radial dimension of a circle formed by connecting bottoms of the recessed portions of the outer surface of the shaft section and among the projecting portions.

14. The bearing device for a wheel according to claim 11, wherein an inner diameter dimension of the inner surface of the hole portion of the hub wheel is set to be smaller than a maximum radial dimension of a circle formed by connecting vertexes of the projecting portions, and to be larger than a maximum radial dimension of a circle formed by connecting bottoms of the recessed portions of the outer surface of the shaft section and among the projecting portions.

15. The bearing device for a wheel according to claim 1, wherein the projecting portions of the recess-projection fitting structure are provided on the inner surface of the hole portion of the hub wheel, and the recessed portions, which are held in close contact with the projecting portions in the fitting manner, are formed with the projecting portions on the outer surface of the shaft section of the outer joint member by setting at least a hardness of axial end portions of the projecting portions to be higher than that of an outer portion of the shaft section of the outer joint member of the constant velocity universal joint, and by press-fitting the projecting portions on a side of the hub wheel to the shaft section of the outer joint member from a side of the axial end portions of the projecting portions, whereby the recess-projection fitting structure is formed.

16. The bearing device for a wheel according to claim 15, further comprising a housing section for housing an extruded portion caused by formation of the recessed portions by the press-fitting provided on the inner surface of the hole portion of the hub wheel.

17. The bearing device for a wheel according to claim 16, wherein a radial dimension of an arc formed by connecting vertexes of the projecting portions of the hole portion is set to be smaller than an outer diameter dimension of the shaft section of the outer joint member, and an inner diameter dimension of the inner surface of the hole portion among the projecting portions is set to be larger than the outer diameter dimension of the shaft section of the outer joint member.

18. The bearing device for a wheel according to claim 15, wherein a radial dimension of an arc formed by connecting vertexes of the projecting portions of the hole portion is set to be smaller than an outer diameter dimension of the shaft section of the outer joint member, and an inner diameter dimension of the inner surface of the hole portion among the projecting portions is set to be larger than the outer diameter dimension of the shaft section of the outer joint member.

19. The bearing device for a wheel according to claim 1, wherein a sum of circumferential thicknesses of middle portions in a projecting direction of the projecting portions is set to be smaller than a sum of circumferential thicknesses in positions corresponding to the middle portions in projecting portions on a fitting counterpart side in between the projecting portions adjacent to one another in a circumferential direction.

20. The bearing device for a wheel according to claim 1, wherein the recess-projection fitting structure is arranged at an immediate-underside avoiding position with respect to raceway surfaces of the double-row roller bearing.

* * * * *